US 6,246,650 B1

(12) United States Patent
Kuroiwa

(10) Patent No.: US 6,246,650 B1
(45) Date of Patent: Jun. 12, 2001

(54) METHOD AND APPARATUS FOR HIGH SPEED DATA REPRODUCTION

(75) Inventor: Hitoshi Kuroiwa, Shinagawa-Ku (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/523,369

(22) Filed: Mar. 10, 2000

Related U.S. Application Data

(63) Continuation-in-part of application No. 08/990,879, filed on Dec. 15, 1997, now abandoned.

(30) Foreign Application Priority Data

Dec. 18, 1996 (JP) ........................................ 8-338095
Jun. 25, 1997 (JP) ........................................ 9-168552

(51) Int. Cl.[7] ............................................. G11B 15/52
(52) U.S. Cl. ........................ 369/47.38; 369/47.44; 369/47.46; 369/47.48; 369/53.34
(58) Field of Search .................. 369/54, 58, 53, 369/32, 50, 47.36, 47.44, 47.48, 47.46, 53.34

(56) References Cited

U.S. PATENT DOCUMENTS

| 5,572,380 | * | 11/1996 | Fujinami et al. | 360/50 |
| 5,644,561 | | 7/1997 | Son et al. | 369/58 |
| 5,646,921 | * | 7/1997 | Yokota et al. | 369/50 |
| 5,701,284 | | 12/1997 | Lee | 369/50 |
| 5,805,548 | | 9/1998 | Ishihara et al. | 369/50 |
| 5,815,478 | | 9/1998 | Kim | 369/50 |
| 5,835,463 | | 11/1998 | Teshirogi et al. | 369/50 |
| 5,844,866 | | 12/1998 | Fujimoto et al. | 369/50 |
| 5,844,872 | | 12/1998 | Kubo et al. | 369/44.35 |
| 5,856,963 | | 1/1999 | Inagawa et al. | 369/50 |
| 5,862,113 | | 1/1999 | Tsuyuguchi et al. | 369/50 |
| 5,870,363 | | 2/1999 | Sun et al. | 369/50 |
| 5,886,966 | | 3/1999 | Ota et al. | 369/54 |
| 5,943,307 | * | 8/1999 | Takagi et al. | 369/50 |
| 6,044,050 | | 3/2000 | Kuroiwa . | |

FOREIGN PATENT DOCUMENTS 4-63580   10/1992   (JP) .............................. H04L/25/02

* cited by examiner

Primary Examiner—Nabil Hindi
(74) Attorney, Agent, or Firm—Oblon, Spivak, McClelland, Maier & Neustadt, P.C.

(57) ABSTRACT

An information reproducing apparatus is disclosed that comprises measuring means for measuring the intensity of a jitter of a signal read from an information record medium such as a disc, storing means for temporarily storing reproduced information at a first transfer rate, means for reading information stored in the storing means at a second transfer rate that is smaller than the first transfer rate, wherein the maximum speed of the information record medium is set up corresponding to the intensity of the jitter measured by the measuring means.

74 Claims, 18 Drawing Sheets

Fig. 3A

| 98n+1 | SYNCHRONOUS PATTERN | | | | | | |
|---|---|---|---|---|---|---|---|
| 98n+2 | SYNCHRONOUS PATTERN | | | | | | |
| 98n+3 | $P_1$ | $Q_1$ | $R_1$ | $S_1$ | $T_1$ | $U_1$ | $V_1$ | $W_1$ |
| 98n+4 | $P_2$ | $Q_2$ | $R_2$ | $S_2$ | $T_2$ | $U_2$ | $V_2$ | $W_2$ |
| ⋮ | ⋮ | ⋮ | ⋮ | ⋮ | ⋮ | ⋮ | ⋮ | ⋮ |
| 98n+97 | $P_{95}$ | $Q_{95}$ | $R_{95}$ | $S_{95}$ | $T_{95}$ | $U_{95}$ | $V_{95}$ | $W_{95}$ |
| 98n+98 | $P_{96}$ | $Q_{96}$ | $R_{96}$ | $S_{96}$ | $T_{96}$ | $U_{96}$ | $V_{96}$ | $W_{96}$ |
| $98_{(n+1)}+1$ | | | | | | | |

Fig. 3B

| $Q_1 \sim Q_4$ | $Q_5 \sim Q_8$ | $Q_9$ $\sim$ $Q_{80}$ | $Q_{81}$ $\sim$ $Q_{96}$ |
|---|---|---|---|
| CONTROL | ADDRESS | SUB Q DATA | CRC |

Fig. 5

STRUCTURE OF TOC (EXAMPLE OF DISC HAVING SIX TRACKS)

| TNO | BLOCK NO. | POINT | PMIN, PSEC, PFRAME | |
|---|---|---|---|---|
| 00 | n | 01 | 00.02.32 | START POINT OF TRACK #1 |
| | n+1 | 01 | 00.02.32 | |
| | n+2 | 01 | 00.02.32 | |
| | n+3 | 02 | 10.15.12 | START POINT OF TRACK #2 |
| | n+4 | 02 | 10.15.12 | |
| | n+5 | 02 | 10.15.12 | |
| | n+6 | 03 | 16.28.63 | START POINT OF TRACK #3 |
| | n+7 | 03 | 16.28.63 | |
| | n+8 | 03 | 16.28.63 | |
| | n+9 | 04 | . . | |
| | n+10 | 04 | . . | |
| | n+11 | 04 | . . | |
| | n+12 | 05 | . . | |
| | n+13 | 05 | . . | |
| | n+14 | 05 | . . | |
| | n+15 | 06 | 49.10.03 | START POINT OF TRACK #6 |
| | n+16 | 06 | 49.10.03 | |
| | n+17 | 06 | 49.10.03 | |
| | n+18 | A0 | 01.00.00 | TRACK NUMBER OF FIRST TRACK OF DISC |
| | n+19 | A0 | 01.00.00 | |
| | n+20 | A0 | 01.00.00 | |
| | n+21 | A1 | 06.00.00 | TRACK NUMBER OF LAST TRACK OF DISC |
| | n+22 | A1 | 06.00.00 | |
| | n+23 | A1 | 06.00.00 | |
| | n+24 | A2 | 52.48.41 | START POINT OF LEAD-OUT TRACK |
| | n+25 | A2 | 52.48.41 | |
| 00 | n+26 | A2 | 52.48.41 | |
| 00 | n+27 | 01 | 00.02.32 | REPEATED |
| | n+28 | 01 | 00.02.32 | |
| | . | . | . . | |
| | . | . | . . | |
| | . | . | . . | |

Fig. 15

|  |  | ROTATION MODE OF SPINDLE MOTOR ||
|  |  | CLV MODE | CAV MODE |
| --- | --- | --- | --- |
| ROTATION SPEED | 1.0 TIMES | A | D |
| | 1.5 TIMES | B | E |
| | 2.0 TIMES | C | F |

METHOD AND APPARATUS FOR HIGH SPEED DATA REPRODUCTION

This Appln is a C-I-P of Ser. No. 08/990,879 filed Dec. 15, 1997, abnd.

BACKGROUND OF THE INVENTION

1. Field of the Invention

The present invention relates to a reproducing apparatus for reproducing information from a record medium such as an optical disc, a magneto-optical disc, or a video tape.

2. Description of the Related Art

In an apparatus that reads information using a relative motion between an information record medium and an information read head as in a reproducing apparatus for an optical disc, a magneto-optical disc, or a video tape, a noise referred to as a jitter takes place in a reproduced signal due to deformation of a record medium, a dislocation thereof, an irregular rotation of a driving unit that drives the record medium and a record head. Thus, since the jitter takes place due to a dislocation of a relative motion between the record medium and a deformation of the record medium, the jitter becomes strong proportional to the relative speed and the read speed of the read head.

On the other hand, as record media and reproducing apparatuses have advanced, the record densities of record media have been increased and the amount of information that can be read in a unit time has become large. However, the required amount of information such as audio information and video information reproduced on a TV display is constant per unit time. Thus, in the field of audio and video apparatuses, information can be read faster than it is used. With the speed difference, information is temporarily stored in a storing unit such as a RAM (Random Access Memory) at a high transfer rate. The information is read from the storing unit at a low transfer rate and then supplied to an audio portion and a video portion.

In the case that a storing unit is used as a buffer for information, even if the reading operation of information is temporarily stopped due to skipping of a read head or dislocation of a record medium, when the reading operation is restored before the information stored in the storing unit becomes empty, information can be successively supplied to the audio portion and the video portion, not suspended. The structure that provides an optical disc reproducing apparatus with a shock proof performance is referred to as an ESP (Electric Shock Proof) structure. The storing unit that temporarily stores information is referred to as a shock proof memory.

In the optical disc reproducing apparatus equipped with such a shock proof function, digital data is read and stored corresponding to control data recorded on an optical disc. Alternatively, the optical system is reallocated corresponding to the control data. Thus, when the control data cannot be successively read, the data cannot be accurately reproduced. Alternatively, since the data cannot be properly connected, a continuous of the audio output cannot be maintained. Thus, in the system where the control data has been recorded on a record medium such as a disc along with audio data and video data, even if the audio data and video data are correctly read, when the control data cannot be successively read, data cannot be stored in the shock proof memory.

Audio digital data is error-corrected with CIRC (Cross Interleaved Reed Solomon Code). In contrast, with respect to control data, only CRC error correction code is added. Thus, the reliability of the control data is lower than the reliability of the audio digital data. This structure is a bottleneck in the shock proof process of a disc that has a large jitter. With a disc having a large jitter, since the read level of a high frequency component (as in a read signal of short pits) is normally low, when the reproduction speed of the optical disc is increased, the S/N (Signal/Noise) ratio deteriorates due to the influence of an electric noise of the reproducing circuit. Thus, the control data cannot be correctly read.

To easily read the control code, it is necessary to decrease the reproduction speed. However, in this case, the data read speed decreases. Thus, the shock proof function deteriorates and thereby the shock proof performance decreases.

OBJECTS AND SUMMARY OF THE INVENTION

Therefore, an object of the present invention is to provide a reproducing apparatus that is not adversely affected by a jitter.

Another object of the present invention is to provide a reproducing apparatus that automatically measures a jitter and reads data at the highest read speed available corresponding to the intensity of the jitter.

The present invention is an information reproducing apparatus, comprising a reproducing means for reproducing information read from a record medium by reading means, a driving means for driving the record medium relative to the reading means, a measuring means for measuring a jitter of information reproduced by the reproducing means, a storing means for temporarily storing information recorded on the record medium at a first transfer rate, a reading means for reading information recorded on the record medium at a second transfer rate that is smaller than the first transfer rate, and a drive controlling means for controlling the speed of the driving means corresponding to the jitter measured by the measuring means.

The present invention is an information reproducing apparatus, comprising a reproducing means for reproducing information read from a record medium by reading means, a driving means for driving the record medium relative to the reading means, a measuring means for measuring a jitter of information reproduced by the reproducing means, a storing means for temporarily storing information recorded on the record medium at a first transfer rate, a reading means for reading information recorded on the record medium at a second transfer rate that is smaller than the first transfer rate, and a drive controlling means for causing the measuring means to measure the jitter a plurality of times while the reproducing means is reproducing the record medium and for controlling the speed of the driving means corresponding to the measured jitter.

Since the maximum speed of the spindle motor is set up corresponding to the value of the jitter of the disc for use, data can be read at the highest available speed as long as a read error does not take place. In addition, the jitter is measured while the data is being reproduced, at intervals of a predetermined time period, or at intervals of a predetermined number of tracks. With the measured jitter, the maximum speed of the spindle motor is set up. Thus, the data can be read at the highest available speed as long as a read error does not take place.

The above and other objects and features of the present invention will become apparent from the following detailed description and the appended claims with reference to the accompanying drawings.

BRIEF DESCRIPTION OF THE DRAWINGS

FIGS. 3A and 3B are schematic diagrams for explaining subcoding data of a CD.

FIG. 5 is a schematic diagram for explaining TOC data of a CD.

FIG. 15 is a schematic diagram showing jitter intensity table data.

DETAILED DESCRIPTION OF THE PREFERRED EMBODIMENT

Figure 1:
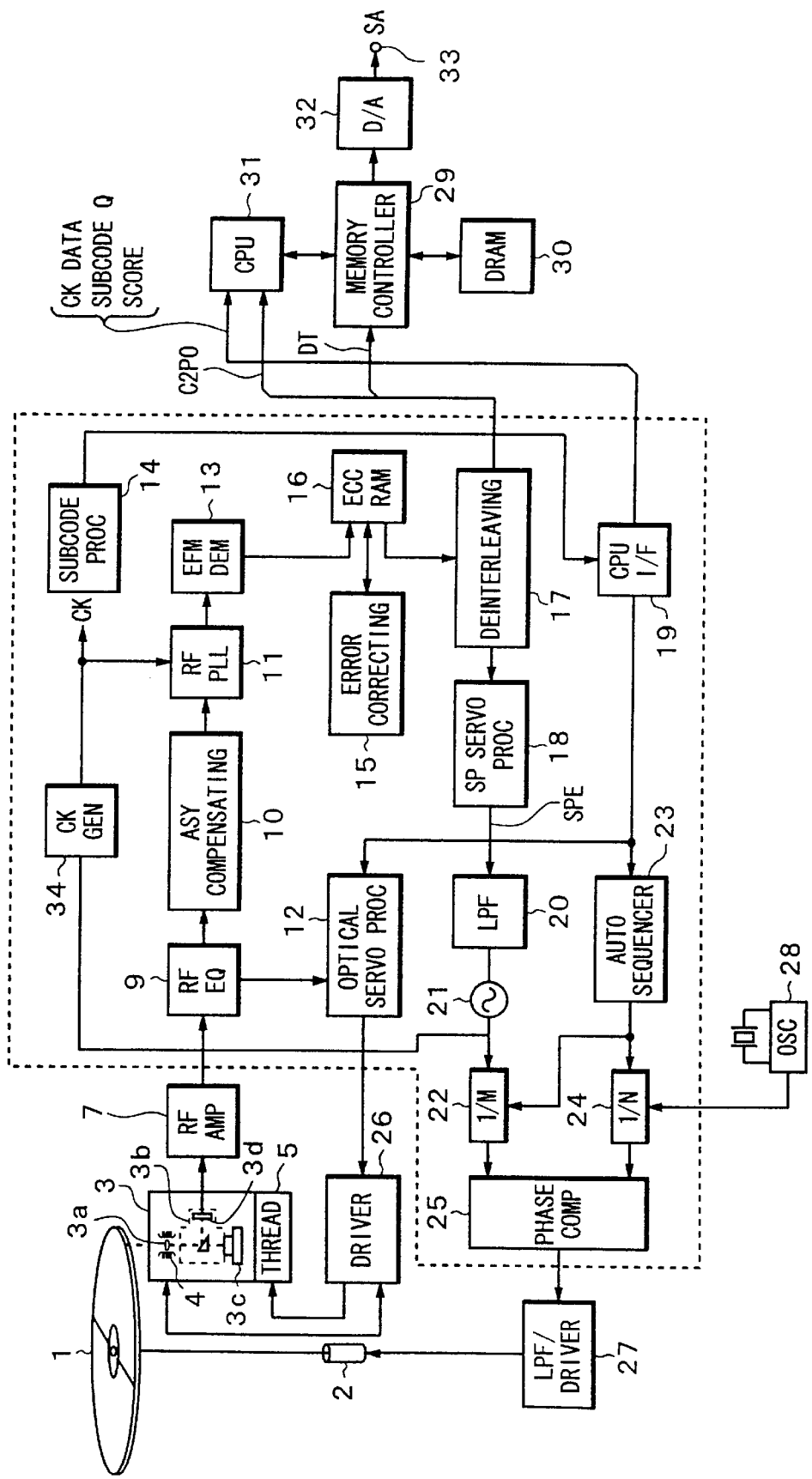
FIG. 1 is a block diagram showing the structure of a CD player according to the present invention.

Next, with reference to the accompanying drawings, an embodiment of the present invention will be described. FIG. 1 is a block diagram showing a CD reproducing apparatus according to the present invention. Referring to FIG. 1, in the state that the disc 1 is rotated and driven by a spindle motor 2, information is read by an optical head 3. The optical head 3 radiates laser light to the disc 1 and reads audio information recorded in the format of, for example, pits on the disc 1 corresponding to the reflected light.

Since data is read from the disc 1 in the above-described manner, the optical head 3 has a laser diode 3c as a laser outputting means, an optical system 3d composed of a polarizing beam splitter, a ¼ wavelength plate, and so forth, an objective lens 3a as a laser output end, and a detector 3b that detects reflected light.

The objective lens 3a is held by a two-axis actuator 4 in such a manner that the objective lens 3a is moved in the radial direction of the disc (the tracking direction) and the contacting direction of the disc (the focusing direction). The optical head 3 is movable in the radial direction of the disc by a thread mechanism 5.

Information detected by the optical head 3 from the disc 1 in the reproducing operation is supplied to an RF amplifier 7. An amplified signal that is output from the RF amplifier 7 is supplied to an RF equalizing portion 9 of a digital signal processing processor (hereinafter referred to as a DSP).

The RF equalizing portion 9 performs a operation process for the received information so as to extract a reproduced RF signal (an EFM signal), a tracking error signal TE, a focus error signal FE, and so forth.

The reproduced RF signal is supplied as a binary signal, that is, an EFM signal (an Eight-Fourteen modulation signal) to an EFM demodulating portion 13 through an asymmetry compensating circuit 10 and an RF-PLL circuit 11. The RF-PLL circuit 11 performs a so-called PLL operation to generate a reproduced clock that synchronizes with the EFM signal and supplies the reproduced clock as a clock for a decoding process to the EFM demodulating portion 13.

The EFM demodulating portion 13 demodulates the EFM signal and extracts a subcode component (that will be described later). A subcode processing portion 14 decodes the subcode data (for example, the subcode processing portion 14 extracts subcode Q data).

The subcode data is supplied to a CPU 31 that functions as a system controller of the CD player through a CPU interface portion 19 (hereinafter referred to as CPU-IF).

Data that has been demodulated by the EFM demodulating portion is written to an ECC-RAM 16. The ECC-RAM 16 performs a CIRC decoding process through an error correcting portion 15 that performs reading/writing processes. In other words, the ECC-RAM 16 perform a C1 correction process and a C2 correction process.

A deinterleaving circuit 17 deinterleaves the CIRC-decoded data and demodulates the data as digital audio data that has been sampled at 44.1 kHz and quantized with 16 bits. Digital audio data DT is temporarily stored in a buffer memory 30 under the control of a memory controller 29. Data (digital audio data DT) that is read from the buffer memory 30 at a predetermined timing is converted by a D/A converter 32. The resultant analog audio signal $S_A$ is provided as, for example, audio signals on left and right channels to an audio amplifier through a terminal 33.

The buffer memory 30 is composed of a D-RAM. The buffer memory 30 stores the digital audio data DT for approximately 3 seconds as a audio output. The buffer memory 30 has a larger storage capacity than that of the example. The buffer memory 30 may be composed of other than the D-RAM.

With the buffer memory 30, an electric shock proof function (ESP) function can be accomplished.

In other words, the rotation speed of the disc 1 by the spindle motor 2 is adjusted. Signal processes performed from the optical head 3 to the DSP 8 are performed at a high speed. The decoded digital audio data DT is written to the buffer memory 30.

On the other hand, data is read from the buffer memory 30 at the normal speed under the control of the memory controller 29. Thus, audio signal is reproduced and output at the normal speed.

Because of the difference between the write bit rate of the buffer memory 30 and the read bit rate thereof, a predetermined amount of data is always stored in the buffer memory 30. Thus, when the optical head 3 temporarily stops reading data from the disc 1 due to a track jump caused by a disturbance, since data can be read from the buffer memory 30, the data reproduction is not interrupted. The optical head 3 restores the reading operation from the proper position while the stored data is being reproduced.

As the above-described subcode data, subcode information recorded on the disc 1 (in other words, TOC and address data) is extracted and supplied to the CPU 31. Thus, the CPU 31 can check the continuation of data.

When the error correcting portion 15 cannot correct an error with the C1 and C2 correction processes, it outputs a C2PO signal that represents such a situation. The C2PO signal is supplied to the CPU 31. Thus, the CPU 31 can monitor an occurrence of an error. In addition, a score signal is also supplied from the DSP 8 to the CPU 31. The score signal represents the synchronization of data written to the buffer memory 30.

The tracking error signal TE and the focus error signal FE obtained by the RF equalizing portion 9 are supplied to an optical system servo signal processing portion 12.

The optical system servo processing portion 12 generates a servo drive signal corresponding to the tracking error signal TE, the focus error signal FE, a track jump command, an access command, and so forth received from the CPU 31 through a CPU-IF 19.

The optical system servo signal processing portion 12 generates a servo signal as a PWM modulation signal corresponding to the focus error signal FE and supplies the servo signal to a servo driver 26. The servo driver 26 generates a focus drive signal corresponding to the received PWM modulation signal. The focus drive signal is supplied to a focus coil of a two-axis mechanism 4. In other words, the objective lens 3a is driven corresponding to the focus drive signal in the focus direction.

When a focus searching operation is performed, the optical system servo signal processing portion 12 turns off a focus servo loop and supplies the PWM modulation signal for a voltage value to be generated to the servo driver 26 corresponding to a search voltage under the control of the CPU 31. The servo driver 26 supplies a focus search voltage as a focus drive signal to the focus coil of the two-axis mechanism 4 corresponding to the supplied PWM modulation signal.

In addition, the optical system servo signal processing portion 12 generates a servo signal as the PWM modulation signal corresponding to the tracking error signal TE. The servo signal is supplied to the servo driver 26. The servo driver 26 generates a tracking drive signal corresponding to the received PWM modulation signal and supplies the tracking drive signal to the tracking coil of the mechanism 4. In other words, the servo driver 26 drives the objective lens in the tracking direction corresponding to the tracking drive signal.

The optical system servo signal processing portion 12 extracts a low band component from the tracking error signal TE to generate a thread servo signal as the PWM modulation, and supplies the thread servo signal to the servo driver 26. The servo driver 26 generates a thread drive signal corresponding to the servo signal and drives a thread mechanism 5.

As described above, the RF-PLL circuit 11 supplies the reproduced EFM signal to the PLL circuit and thereby generates a reproduced clock that synchronizes with the reproduced RF signal. The reproduced clock is used for various processes such as EFM decoding. The reproduced clock is a signal that synchronizes with rotations of the disc 1. A spindle servo signal processing portion 18 in the DSP 8 compares the reproduced clock with a reference clock generated by the master clock and obtains the difference as a spindle error signal SPE.

Normally, a drive signal for driving the spindle motor is generated corresponding to the spindle error signal SPE. However, in the example, the wide-capture method is used in the DSP 8. Namely, the system clock is locked with the rotation of the spindle motor 2. Thus, the signal process in the DSP 8 is performed by the clock.

Thus, the spindle error signal SPE that is received from the spindle servo signal processing portion 18 is supplied to a voltage control oscillator (VCO) 21 through a low pass filter 20 that limits a band. In other words, the spindle error signal SPE is used as a control voltage of the VCO 21.

Since the spindle error signal SPE varies in correspondence with to the rotation speed of the spindle motor 2, the VCO oscillates in correspondence with to the rotation speed of the spindle motor 2. The oscillated output signal of the VCO 21 is supplied to a clock generator 34. The clock generator 34 generates the master clock of the DSP system corresponding to the oscillated output signal of the VCO 21. The master clock CK is used as a reference clock of the RF-PLL circuit 11. In addition, the master clock CK becomes the reference of the process in the DSP 8. Thus, the entire signal processing system of the DSP 8 performs a process corresponding to the rotation speed of the spindle motor 2.

Since the DSP 8 operates with the clock corresponding to the rotation speed of the spindle motor 2, while the spindle motor 2 is being accelerated, although the clock cannot be read out in normal condition, the read data can be decoded. For example, when the disc 1 is chucked and the rotation of the spindle motor 2 is started, data can be quickly read.

An output signal of the VCO 21 is frequency-divided by a 1/M frequency divider 22, the resultant signal is supplied to a phase comparator 25. On the other hand, the frequency of the system clock received from the crystal oscillator 28 that is a crystal clock generator is divided by a 1/N frequency divider 24 and then the resultant signal is supplied to the phase comparator 25. The frequency dividing ratios M and N of the 1/M frequency divider 22 and the 1/N frequency divider 24 are controlled by the command from CPU 31 through an auto sequencer 23.

When the phase comparator 25 compares the phase of the output signal of the VCO 21 and the phase of the system clock received from the oscillator 28, a drive control signal of the spindle motor 2 is generated. A drive power corresponding to the drive control signal is supplied from an LPF and spindle driver 27 to the spindle motor 2. Thus, the spindle motor 2 is controlled so that it rotates at a predetermined CLV speed.

When the frequency dividing ratios of the 1/M frequency divider 22 and the 1/N frequency divider 24 are set to particular values, the rotation line speed of the spindle motor 2 can be controlled to any speed such as standard speed (1.0 times the speed), 1.5 times the speed, 2 times the speed, and the like. In other words, the CPU 31 controls the auto sequencer 23 through the CPU-IF 19 so as to vary the rotation speed of the spindle motor. In addition, with FG (Frequency Generator) pulses received from the spindle motor 2, the spindle motor 2 can be controlled so that it rotates at CAV (Constant Angular Velocity).

Next, TOC (Table of Contents) and subcode that are recorded in a lead-in area of the disc 1 (CD-DA: CD-Digital Audio) will be described.

The minimum record unit of the CD-DA is one frame. One block (one subcode frame) is composed of 98 frames.

Figure 2:
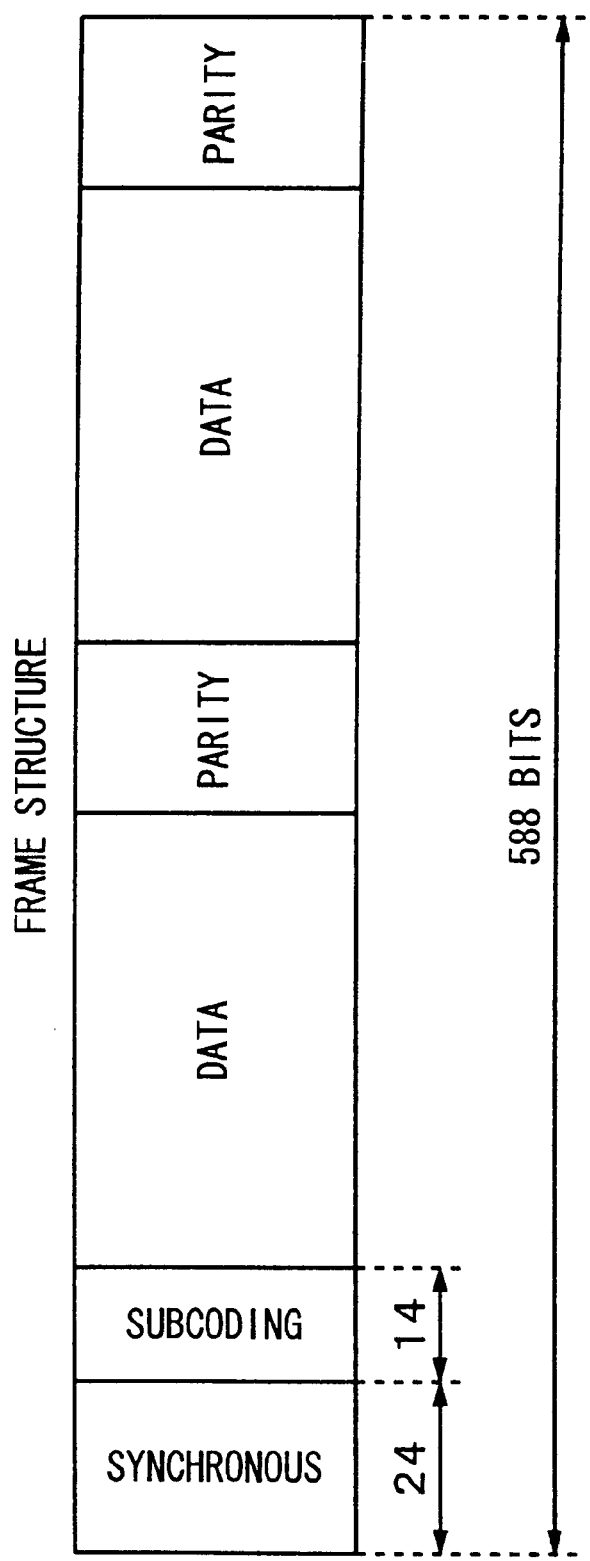
FIG. 2 is a schematic diagram for explaining the frame structure of a CD.

FIG. 2 shows the structure of one frame. One frame is composed of 588 bits. The first 24 bits of one frame are synchronous data. The next 14 bits are a subcode area. The subcode area is followed by data and parity.

One block is composed of 98 frames. Subcode data obtained from 98 frames is corrected and thereby subcode data of one block is formed as shown in FIG. 3A.

The first and second frames (frames $98n+1$ and $98n+2$) of the 98 frames are synchronous patterns. The third frame to 98-th frames (frame $98n+3$ to frame $98n+98$) are channel data. In each frame, subcode data of channels P, Q, R, S, T, U, V, and W (each of which is composed of 96 bits) is formed.

To access each frame, the channels P and Q are used. However, the channel P represents a pause portion between tracks. However, the accessing operation is controlled with the channel Q ($Q_1$ to $Q_{96}$). FIG. 3B shows the structure of data of the channel Q composed of 96 bits.

Four bits $Q_1$ to $Q_4$ are control data. The four bits $Q_1$ to $Q_4$ are used to identify the number of audio channels, emphasis, CD-ROM, and so forth.

In other words, the four-bit control data is defined as follows.

"0***" . . . 2-channel audio
"1***" . . . 4-channel audio
"*0**" . . . CD-DA
"*1**" . . . CD-ROM
"**0*" . . . Digital copy disabled
"**1*" . . . Digital copy enabled
"***0" . . . Absence of pre-emphasis
"***1" . . . Presence of pre-emphasis Four bits $Q_5$ to $Q_8$ represent an address. These four bits are control bits of the sub Q data.

When the four bits $Q_5$ to $Q_8$ that represent an address are "0001", the subsequent sub Q data of $Q_9$ to $Q_{80}$ represents audio Q data. When the four bits $Q_5$ to $Q_8$ are "0100", the subsequent sub Q data of $Q_9$ to $Q_{80}$ represents video Q data.

72 bits $Q_9$ to $Q_{80}$ are sub Q data. The remaining bits $Q_{81}$ to $Q_{96}$ are CRC.

In the lead-in area, the sub Q data recorded therein is TOC information.

Figure 4A:
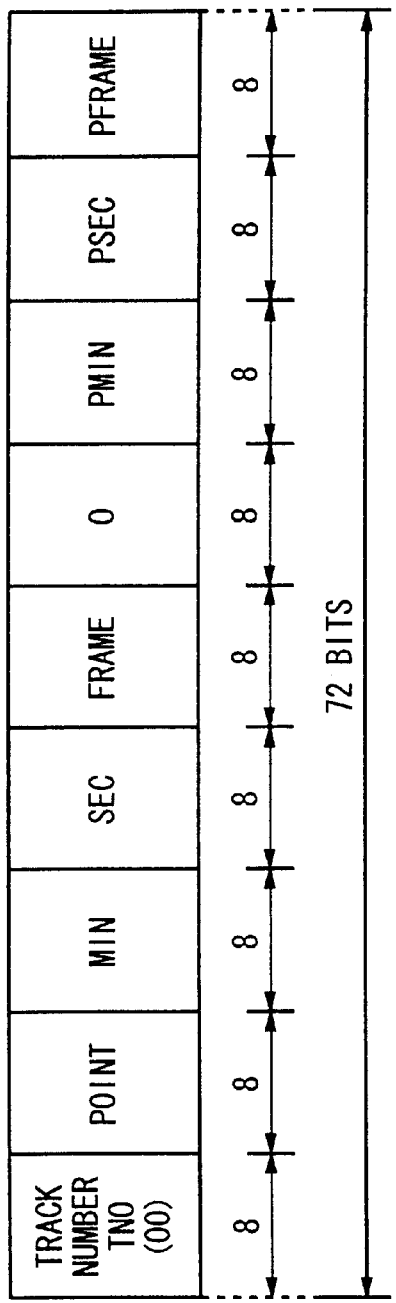
FIGS. 4A and 4B are schematic diagrams for explaining sub Q data of a CD.

In other words, sub Q data of 72 bits $Q_9$ to $Q_{80}$ of Q-channel data read from the lead-in area has information as sown in FIG. 4A. Sub Q data has data composed of eight bits.

First, a track number is recorded. In the lead-in area, the track number is fixed to "00".

Next, POINT is recorded. In addition, MIN (minute), SEC (second), and FRAME (frame number) are recorded as elapsed time in the current track.

In addition, PMIN, PSEC, and PFRAME are recorded. The meaning of PMIN, PSEC, and PFRAME depends on the value of POINT.

When the value of POINT is in the range from "01" to "99", the value represents a track number. In this case, the start point of the track with the track number is recorded as minute (PMIN), second (PSEC), and frame number (PFRAME).

When the value of POINT is "A0", the track number of the first track is recorded as PMIN. In addition, depending on the value of PSEC, CD-DA, CD-I, and CD-ROM (XA specification) are distinguished.

When the value of POINT is "A1", the track number of the last track is recorded as PMIN.

When the value of POINT is "A2", the start point of the lead-out area is recorded as SMIN, PSEC, and PFRAME.

In the case of a disc having six tracks, data shown in FIG. 5 is recorded as TOC of sub Q data. As shown in FIG. 5, all track numbers TNOs are "00".

Block No. represents a Q data number of one unit read as block data of 98 frames.

Three successive blocks of TOC data have the same contents.

As shown in FIG. 5, when the value of POINT is in the range from "01" to "06", the start point of the tracks #1 to #6 is recorded as PMIN, PSEC, and PFRAME.

When the value of POINT is "A0", a track number "01" is recorded as PMIN. The value of PSEC distinguishes the type of a disc. When the disc is a CD-DA, the value of PSEC is "00". When the disc is a CD-ROM (XA specification), the value of PSEC is "20". When the disc is a CD-I, the value of PSEC is "10".

When the value of POINT is "A1", the track number of the last track is recorded as PMIN. When the value of POINT is "A2", the start point of the lead-out area is recorded as PMIN, PSEC, and PFRAME.

After block n+27, the contents of the blocks n to n+26 are repeatedly recorded.

Figure 4B:
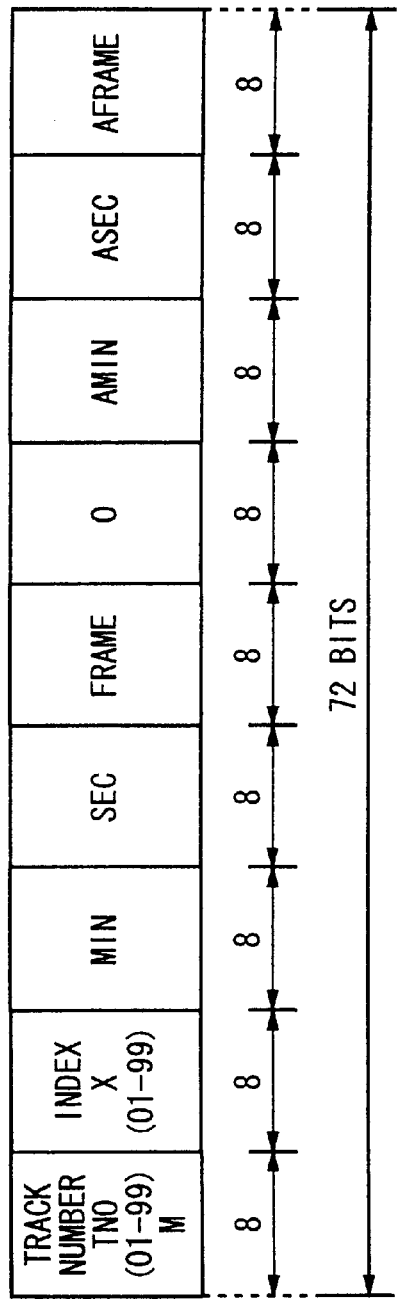

In the tracks #1 to #n for data of music programs or the like on the disc 1 and in the lead-out area, sub Q data recorded therein has information shown in FIG. 4B.

First, a track number is recorded. In tracks #1 to #n, one of the track numbers "01" to "99" is recorded. In the lead-out area, the track number is "AA".

Next, information that allows each track to be sub-categorized is recorded as an index.

Elapsed time in the current track is recorded as MIN (minute), SEC (second), and FRAME (frame number).

In addition, an absolute address is recorded as minute (AMIN), second (ASEC), and frame number (AFRAME).

TOC and subcode are formed in the above-described manner. Thus, an address of the disc is recorded as AMIN, ASEC, and AFRAME for every 98 frames.

The 98 frames (one block) are referred to as one subcoding frame. Audio data for one second contains 75 subcoding frames. Thus, the value of AFRAME as an address is in the range from "0" to "74". In a frame checking process (that will be described later), the continuity of data is checked for each subcoding frame.

In the CD player according to this example, the ESP function using the buffer memory 30 is performed. Next, a process in the reproducing mode of the CPU 31 in the case that the ESP function is executed will be described with reference to FIGS. 6 and 7.

To execute the ESP function in reproducing data from the disc 1, in the CD player according to this example, the CPU 31 reads the data at a predetermined transfer rate and checks for a drop state of read data so as to continue the reproduced audio signal.

In addition, the space of the data buffer memory 30 is monitored and depending on the state of the remaining amount of data in the buffer memory 30, the CPU 31 checks for an error correction state so as to prevent data in bad quality from being output as reproduced audio signal output.

Figure 6A:
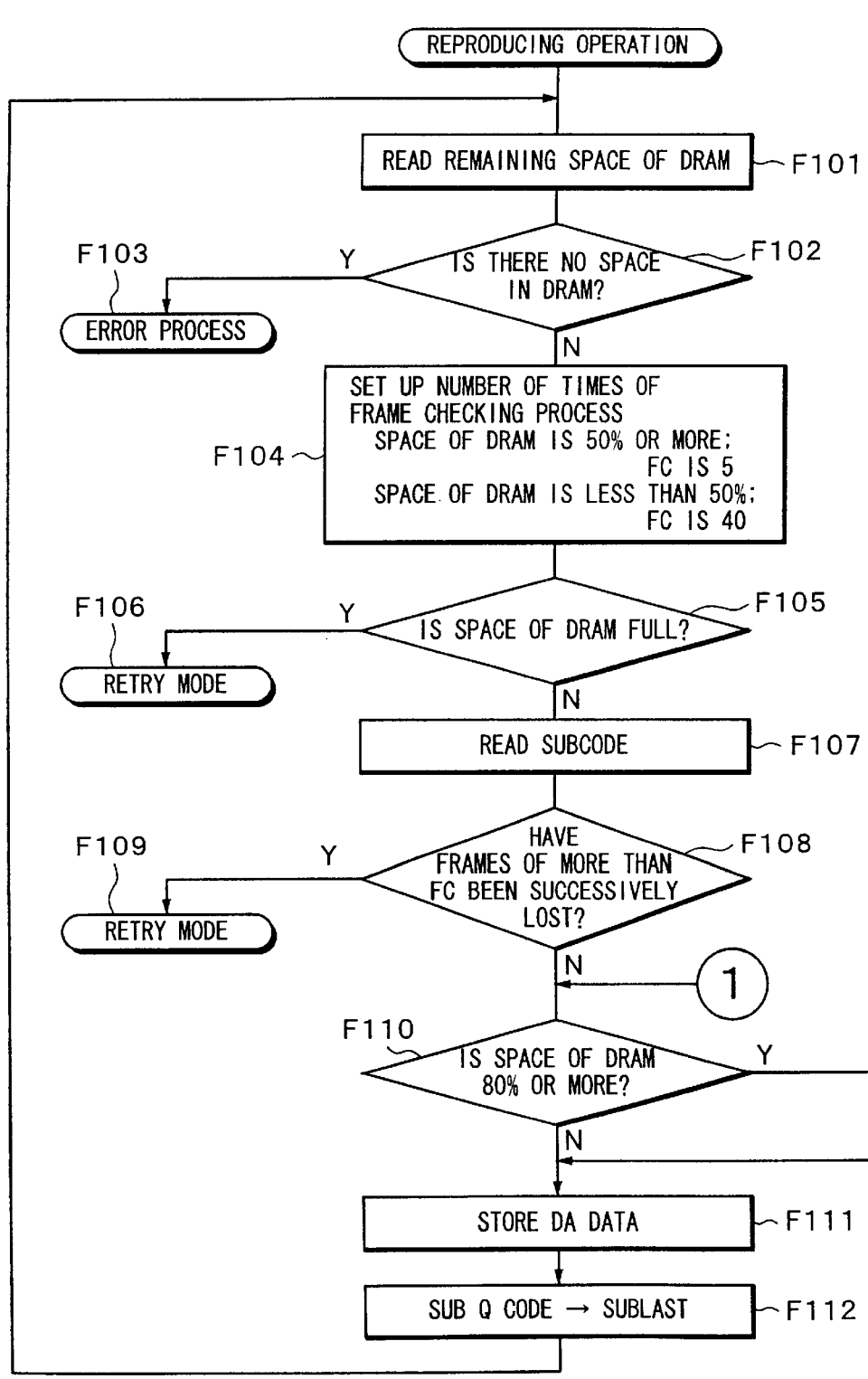
FIGS. 6A and 6B are flow charts showing a process of an ESP function.
Figure 6B:
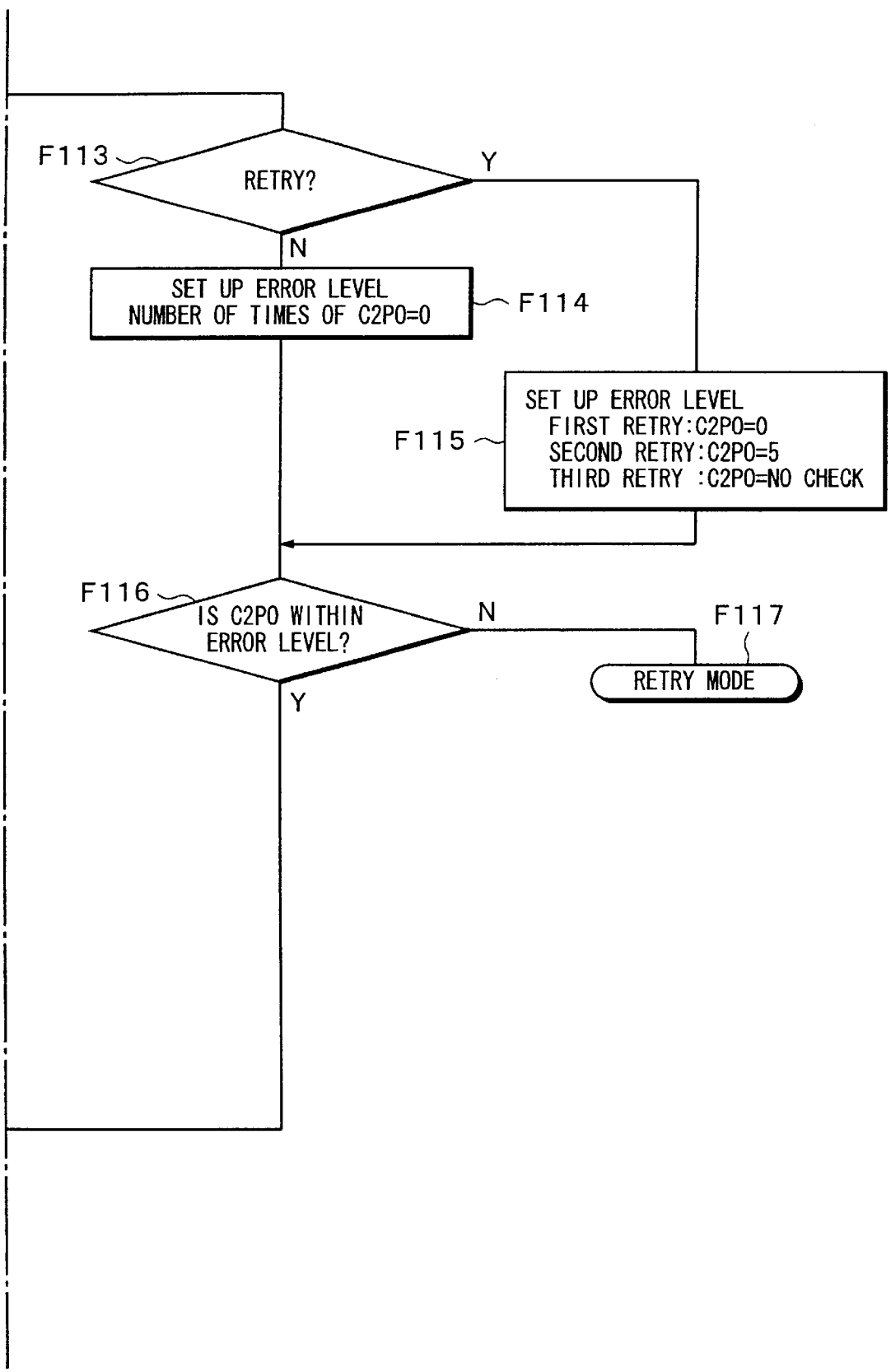
Figure 7:
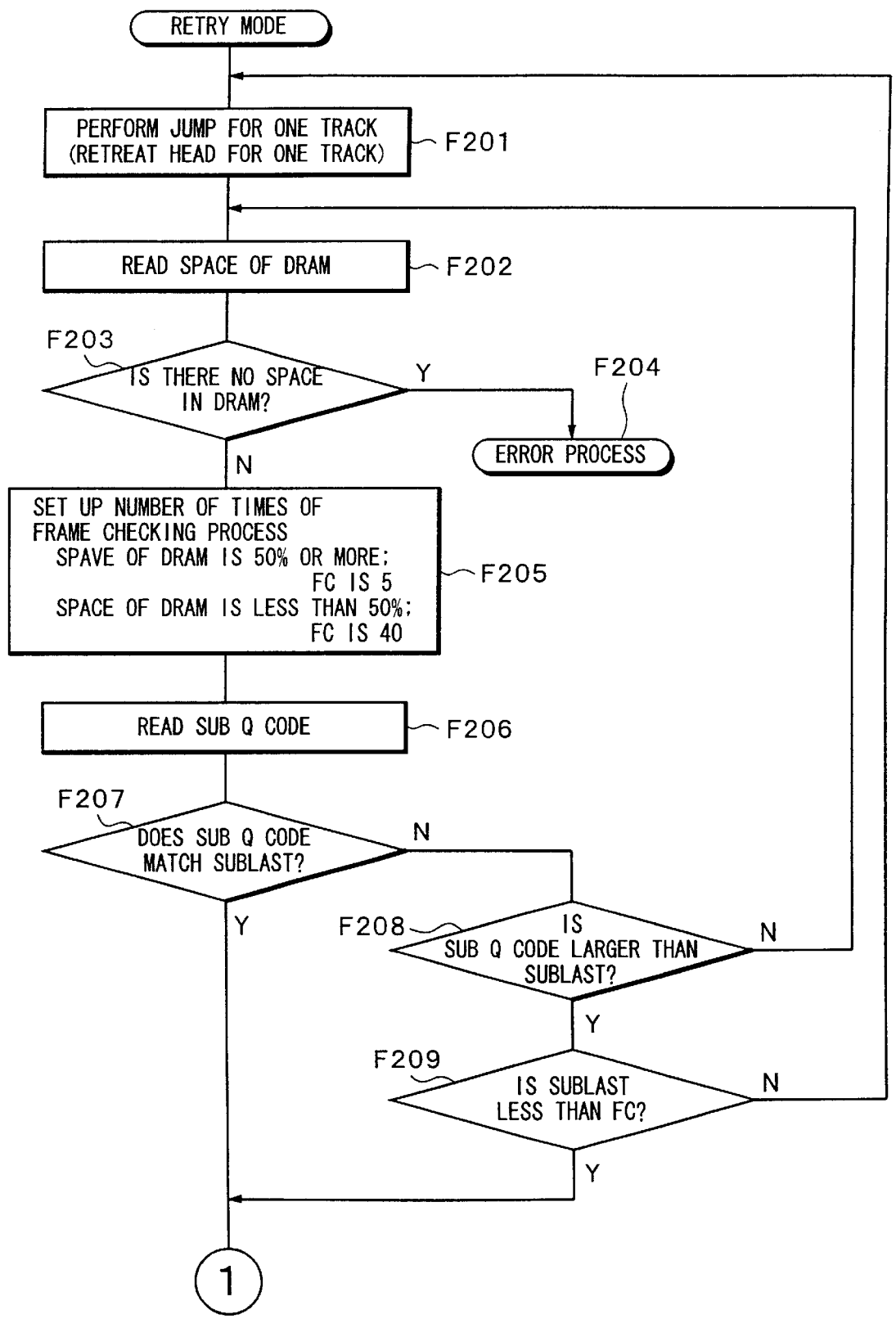
FIG. 7 is a flow chart showing a process of a retry mode.

FIGS. 6 and 7 are flow charts showing processes of the CPU 31, the processes including the frame checking process and the error checking process.

When the disc 1 is loaded to the position of the optical head 3 (so that data can be reproduced), the CPU 31 causes the optical head 3 to read TOC data recorded on the innermost periphery of the disc.

In other words, the CPU 31 causes the optical head 3 to reproduce the lead-in area and reads TOC data that is extracted by the subcode processing portion 14. With the TOC data, the CPU 31 can obtain addresses of individual tracks of the loaded disc 1 and thereby can control the reproducing operation.

After starting the reproducing operation, the CPU 31 performs a process for the ESP operation as shown in FIG. 6.

At step F101, the CPU 31 monitors the amount of data stored in the buffer memory 30.

In this example, the monitored result of the amount of stored in the buffer memory 30 is used for the frame checking process, the error checking process, and speed setup of the spindle motor (that will be described later).

As the monitored result of the amount of data stored in the buffer memory 30, when there is no data in the buffer memory 30, the reproduced audio output becomes silent. In this case, the process advances from step F102 to step F103. At step F103, the CPU 31 performs an error process.

When there is data in the buffer memory 30, the flow advances to step F104. At step F104, the CPU 31 sets up a reference value for the frame checking process. In this example, the CPU 31 sets up a frame check reference value FC corresponding to the amount of data stored in the buffer memory 30.

Next, the reason why the frame check reference value FC is set up corresponding to the amount of data stored in the buffer memory 30 will be described.

When the continuity of read data is lost due to a track jump caused by disturbance, the CPU 31 rereads data so that the continuity of data can be restored. Thus, the CPU 31 writes data to the buffer memory 30 so that the continuity of reproduced audio output is kept. Consequently, in the reproducing mode, the CPU 31 continuously checks for frames and checks the continuity of read data.

Although it is preferable to check for the continuity of read data as precisely as possible, it is necessary to prevent data stored in the buffer memory 30 from being wasted. In other words, whenever the continuity of read data is lost, if the retry operation is performed, data stored in the buffer memory 30 is wasted. Thus, as the continuity of read data is strictly checked, the number of times of the retry operation is increased. Consequently, the amount of data stored in the buffer memory 30 decreases, thereby deteriorating the shock proof characteristic. The track jump performed for the retry operation results in deteriorating the quality of the reproduced audio signal and increasing the power consumption. In other words, the strict continuity checking process conflicts with the quality of the reproduced audio signal.

In the case that data is lost on the order that the user is not aware of a break of reproduced audio signal, it is assumed that the continuity is not lost. Thus, the CPU 31 does not perform the retry operation, thereby preventing the shock proof characteristic from deteriorating. However, strictly speaking, when such a break takes place, the user may hear a choked sound. Thus, it is preferable to perform the retry operation as many times as possible to accurately connect sound data.

To do that, according to the present invention, the CPU 31 changes a criterion for determining whether or not a break of data takes place corresponding to the amount of data stored in the buffer memory 13 so as to keep the continuity of data as precisely as possible and prevent the buffer memory 13 from deteriorating the shock proof function.

Figure 8:
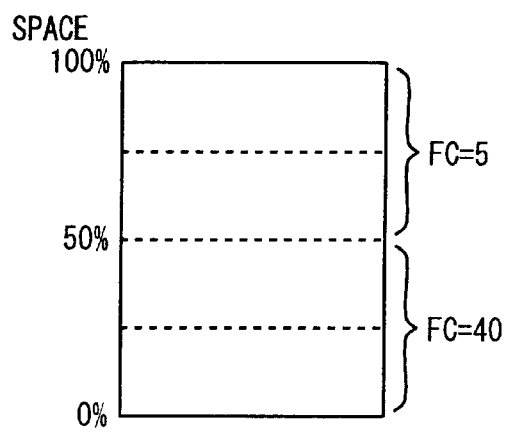
FIG. 8 is a schematic diagram for explaining a setting process of a frame check reference value.
Figure 9:
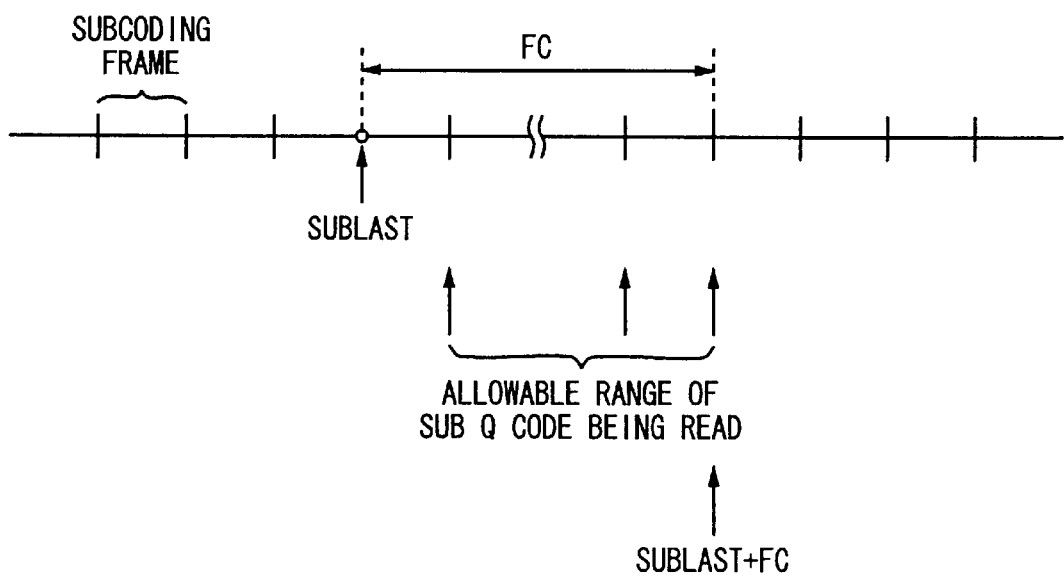
FIG. 9 is a schematic diagram for explaining a continuity determining criterion.

FIGS. 8 and 9 show an example of a frame check reference value FC that has been set up.

It is assumed that when the buffer memory 30 is full (amount of data=100%), data for 3 seconds can be stored. When the amount of data stored in the buffer memory 30 is 50% or more as shown in FIG. 8 (thus, data for 1.5 seconds or more can be output), the reference value FC is 5 (subcoding frames). When the amount of data stored in the buffer memory 30 is less than 50% (thus, data for less than 1.5 seconds can be output), the reference value FC is 40 (subcoding frames).

The frame check reference value FC is a value that represents that when the amount of data that is lost is less than "FC" subcoding frames, it is assumed that no data loss takes place. In other words, as the frame check reference value FC is small, the frame checking process is strictly performed.

In other words, when the buffer memory 30 has sufficient space, the reference value FC is set to 5 so as to strictly perform the frame checking process. In this case, even if the retry operation is performed a proper number of times, since the time tolerance is large, the shock proof characteristic is not largely affected. Thus, even if read data breaks, with the retry operation, the continuity of data can be almost restored.

On the other hand, when the buffer memory 30 does not have a sufficient space (in other words, when the space of the buffer memory 30 is equivalent to data for 0 second to 1.5 seconds), the CPU 31 sets the reference value FC to 40 so as to coarsely perform the frame checking process.

When the retry operation is performed a number of times, due to the shock proof characteristics, the situation where the buffer memory 30 does have not space may occur. In this case, the frame checking process is performed so that the retry operation is not frequently performed. Thus, the situation where the buffer memory 30 does not have space can be prevented as much as possible. In other words, at this point, although the situation of several minutes of lack of audio signal is permitted to some extend, the situation of no sound is prevented.

After the CPU 31 has set up the frame check reference value FC at step F104 (in FIG. 6), the flow advances to step F105. At step F105, the CPU 31 determines whether or not the buffer memory 30 is full. When the buffer memory 30 is full, the CPU 31 temporarily stops writing data to the buffer memory 30. At this point, the flow advances to step F106. At step F106, the CPU 31 performs a sound connecting process for writing subsequent data at a predetermined timing in the retry mode.

In this example, the CPU 31 adjusts the rotation speed of the spindle motor 2 in such a manner that the buffer memory 30 does not become full. Thus, in the normal state, at step F105, the CPU 31 does not determine that the buffer memory 30 is full.

When the buffer memory 30 is not full, the flow advances to step F107. At step F107, the CPU 31 performs the frame checking process.

In the process shown in FIG. 6, since sub Q data that has been read at step F112 is stored as a variable SUBLAST, the CPU 31 compares the current sub Q data that has been read at step F107 with the last sub Q data stored as the variable SUBLAST.

As described above, when the continuity of data is not lost at all, the difference between the current address and the last address should be one subcoding frame. However, a drop of data of up to 5 subcoding frames does not influence the reproduced audio signal.

Thus, at step F108, when the difference between the current address and the last address is within the frame check reference value FC, the CPU 31 determines that the continuity is OK.

In other words, as shown in FIG. 9, when the address of the current sub Q data is equal to an address value of which the last sub Q data SUBLAST and the frame check reference value FC are added, the CPU 31 determines that the continuity is OK.

As described above, since the frame check reference value FC is set up corresponding to the space of the buffer memory 30, as the space of the buffer memory 30 is large, the continuity is strictly checked. In contrast, when the space of the buffer memory 30 is small, the continuity is checked.

When the amount of data that has dropped exceeds the frame check reference value FC as the determined result at step F108, the CPU 31 determines that the continuity of data is lost. Thus, the flow advances to step F109. At step F109, the CPU 31 performs the read retry operation.

When the continuity is OK as the determined result at step F108, the flow advances to step F110. At step F110, the CPU 31 determines whether or not to execute the error checking process.

The error checking process is performed by detecting the amount of data that cannot be corrected (namely, the number of occurrences of C2PO). When the number of occurrences of C2PO exceeds a predetermined value that has been set up as an error level, the CPU 31 determines that read data of the current subcoding frame does not satisfy a predetermined quality level. Thus, the CPU 31 performs the read retry operation.

The CPU 31 performs such error checking process only when the amount of data stored in the buffer memory 30 is 80% or more as the determined result at step F110. In other words, when the space of the buffer memory 30 is sufficient, the flow advances to step F113. At step F113, the CPU 31 determines whether or not the current data has been read in the normal reproducing operation or the retry mode (that will be described later).

In the normal reproducing operation, at step F114, the CPU 31 sets the error level as an error check criterion to "0". The error check level "0" represents that only when the number of occurrences of C2PO is "0", the CPU 31 determines that the result of the error checking process is OK.

On the other hand, in the retry mode, the CPU 31 changes the check criterion in steps. In other words, in the first retry process, the CPU 31 sets the error level to "0". In the second retry process, the CPU 31 sets the error level to "5". In other words, the CPU 31 permits up to five occurrences of C2PO.

In the third retry process, the CPU 31 does not set up an error level. In other words, the CPU 31 does not substantially perform the error checking process.

As with the case that the frame check reference value is set up corresponding to the space of the buffer memory 30, the error level is varied in steps so as to satisfy contradictory requirements for obtaining reproduced data in high quality and for preventing the space of the buffer memory 30 from becoming zero.

At step F116, the CPU 31 performs the error checking process corresponding to the error level that has been set up at step F114 or F115. In other words, the CPU 31 compares the number of occurrences of C2PO that have taken place in the error correcting process for the subcoding frame with the error level. When the number of occurrences of C2PO exceeds the error level, the CPU 31 determines that the predetermined quality of the data has not been satisfied. Thereafter, the flow advances to step F117. At step F117, the CPU 31 performs the retry operation.

When the result of the frame checking process is OK and the result of the color checking process is OK, the flow advances to step F111. At step F111, the CPU 31 writes the data (digital audio data) to the buffer memory 30. At step F112, the CPU 31 substitutes the current sub Q data into the variable SUBLAST so as to use the current sub Q data as sub Q data in the next frame checking process. Thereafter, the flow returns to step F101. At step F101, the CPU 31 repeats the above-described processes.

When the flow advances to steps F106, F109, or F117 (in FIG. 6), the CPU 31 performs the process in the retry mode. In other words, when the buffer memory 30 becomes full or when the predetermined quality of data is not satisfied as the result of the frame checking process or the error checking process, the CPU 31 performs the sound connecting process as the retry mode shown in FIG. 7. In the sound connecting process, after temporarily stopping writing data to the buffer memory 30, the CPU 31 restores the writing operation of data with the continuity kept.

In the sound connecting process, the CPU 31 causes the optical head 3 to jump for one track so as to retreat the read position on the disc for one peripheral track (at step F201). Thereafter, the CPU 31 checks for the space of the buffer memory 30 (at step F202). When the space of the buffer memory 30 is zero, since the reproduced audio signal becomes silent, the flow advances from step F203 to step F204. At step F204, the CPU 31 performs the error process.

When the space of the buffer memory 30 is not zero, the flow advances to step F205. At step F205, the CPU 31 sets up the frame check reference value FC corresponding to the space of the buffer memory 30. This process is the same as the process at step F104.

At step F206, the CPU 31 reads an address value as sub Q data. At this point, the CPU 31 compares the address value with the variable SUBLAST that is the last sub Q data. The variable SUBLAST is the value of the address of the last data at which the CPU 31 has stopped writing data to the buffer memory 30.

Since the read position has retreated by the one-track jumping operation at step F201, the address that is read at step F206 depends on the situation at that time.

When the address of sub Q data that has been read matches the value of the variable SUBLAST (namely, the address of the last data stored in the buffer memory 30), data of the next subcoding frame (address) is the next data. At this point, the flow advances from step F207 to step F110 shown in FIG. 6 through a path ①. At step F110, the CPU 31 performs the error checking process for the sound data and stores the resultant data to the buffer memory 30. In other words, the CPU 31 restores the normal reproducing mode from the retry mode. When the flow advances to step F113 shown in FIG. 6, since data is read by the retry operation, the CPU 31 sets up the error level corresponding to the number of times of the retry operation at step F115.

When the address as sub Q data that has been read at step F206 is an address prior to the address of the variable SUBLAST, the read data does not reach the address of the subsequent data to be written to the buffer memory 30. Thus, the flow advances to steps F207 and F208 and then returns to step F202. Thus, the CPU 31 continues to read data. Thus, at a particular timing, the address as the sub Q data that has been read at step F207 matches the value of the variable SUBLAST. At this point, the flow advances to step F110 (in FIG. 6). At step F110, the CPU 31 performs the error checking process for the audio data and stores the resultant data to the buffer memory 30.

When the address as the sub Q data that has been read at step F206 exceeds the value (address) of the variable SUBLAST, the flow advances from step F208 to F209. At step F209, the CPU 31 determines whether or not the address is within the frame check reference value FC corresponding to the value of the variable SUBLAST. In other words, the CPU 31 determines whether or not the address is in the allowable range shown in FIG. 9. When the address is within the allowable range, data drop (for example, 5 frames or less) is permitted. Thereafter, the flow advances to step F110 shown in FIG. 6. At step F110, the CPU 31 checks for the error of the audio data and stores the resultant data to the buffer memory 30.

When the address of the data that has been read at step F206 exceeds the value of the variable SUBLAST, the CPU 31 determines that the read position is improper. At this point, the flow returns to step F201. At step F201, the CPU 31 causes the optical head to retreat for one track. By repeating these processes several times, the CPU 31 causes the read position to be moved to the position before the value of the variable SUBLAST and the reference value FC. In other words, at step F207 or F209, there is an opportunity where the determined result at step F207 or F209 is Yes.

In the sound connecting process, the CPU 31 sets up the frame check reference value FC corresponding to the space of the buffer memory 30. Only when the space of the buffer memory 30 is sufficient, the CPU 31 permits a drop of up to 5 subcoding frames strictly to keep data continuity. When the space of the buffer memory 30 is not sufficient for example less than 50%, or there is not enough time, the CPU 31 permits a drop of audio data to some extent, for example, 40 subcoding frames. Thus, the situation where reproduced audio signal becomes silent can be prevented.

As described above, when data is reproduced with the ESP function, the CPU 31 sets up the degree of strictness of the frame checking process corresponding to the space of the buffer memory 30. In addition, the CPU 31 performs the error checking process corresponding to the number of occurrences of C2PO and varies the degree of strictness of the error checking process corresponding to the space of the buffer memory 30 and the number of times of the retry operation. Thus, corresponding to the situation, no sound state due to a drop of the reproduced audio data is prevented with the highest priority. Data stored in the buffer memory 30 can be kept in high quality corresponding to both the frame checking process and the error checking process. Thus, the quality of the reproduced audio can be improved.

According to the embodiment, in addition to the above-described ESP operation, since the CPU 31 causes the buffer memory 30 not to become full, there is no opportunity where the flow advances to step F106 (in FIG. 6). In the retry mode, the number of times of one-track jumping operation at step F201 is minimized. In other words, unless the result of the frame checking process or error checking process is OK, the retry mode is not executed. Thus, the number of times of one-track jumping operation is minimized. Consequently, the adverse influence of the one-track jumping operation is decreased.

Although the CPU 31 causes the buffer memory 30 to not become full, the space of the buffer memory 30 is preferably as much as possible so as to accomplish the shock proof function. In other words, in this example, the buffer memory 30 is kept almost full, but not full. Thus, the sufficient shock proof function and the reproduced audio in high quality are accomplished.

As described above, the CPU 31 causes the auto sequencer 23 to set up the frequency dividing ratios of the 1/M frequency divider 22 and the 1/N frequency divider 24. Thus, the CPU 31 can control the rotation speed of the spindle motor 2 at any speed. In addition, since the DSP 8 operates in correspondence with to the master clock CK that follows the rotation speed of the spindle motor 2, the DSP 8 can read data regardless of the rotation speed of the spindle motor 2.

In other words, when the rotation speed of the spindle motor 2 is varied, the read data rate of data read from the disc 1 and written to the buffer memory 30 can be freely varied.

Thus, by adjusting the speed of the spindle motor 2 corresponding to the space of the buffer memory 30, the difference between the write rate to the buffer memory 30 and the read rate from the buffer memory 30 is adjusted so that the amount of data stored in the buffer memory 30 can be kept to almost full, but not full.

Figure 10:
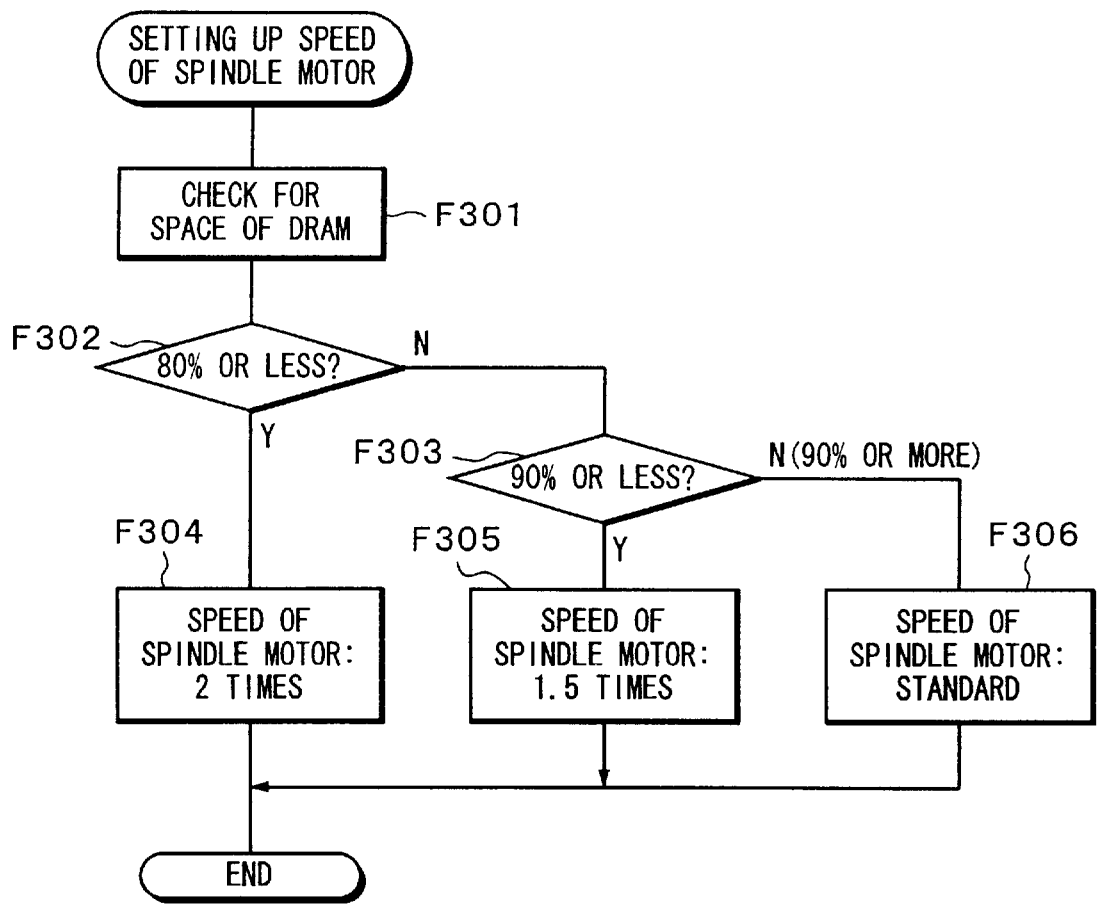
FIG. 10 is a flow chart showing a speed setting process of a spindle motor.

Next, a process performed by the CPU 31 will be described with reference to FIGS. 10 and 11. For example, FIG. 10 is a flow chart showing a controlling process of the CPU 31 for setting up the speed of the spindle motor 2. At step F301, the CPU 31 always checks for the amount of data stored in the buffer memory 30. This process may be common with step F101 shown in FIG. 6 and step F202 shown in FIG. 7.

When the space of the buffer memory 30 is 80% or less, the process advances from step F302 to F304. At step F304, the CPU 31 causes the spindle motor 2 to operate at a speed twice higher than the standard speed.

When the space of the buffer memory 30 is larger than 80% and 90% or less, the process advances to steps F302, F303, and F305. Thus, the CPU 31 causes the spindle motor 2 to operate at a speed 1.5 times higher than the standard speed.

When the space of the buffer memory 30 is larger than 90%, the flow advances to steps F302, F303, and F306. Thus, the CPU 31 causes the spindle motor 2 to operate at the standard speed.

Figure 11:
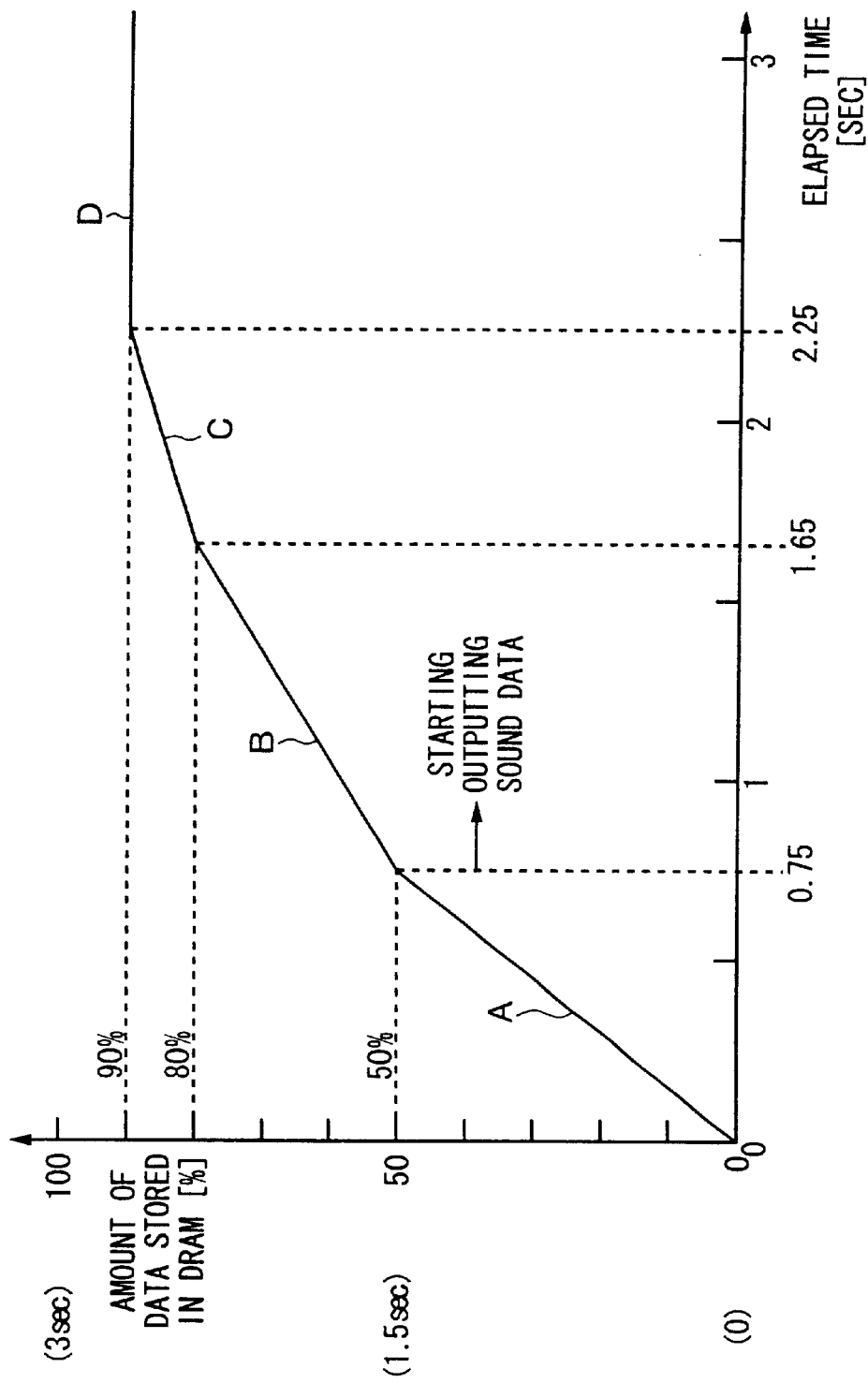
FIG. 11 is a schematic diagram for explaining the speed setting process of the spindle motor.

FIG. 11 shows a transition of the amount of data stored in the buffer memory 30 accomplished by such a process.

In FIG. 11, the vertical axis represents the space of the buffer memory 30. The horizontal axis represents the elapsed time after the reproducing operation is started. In the case that the storage capacity of the buffer memory 30 is 4 Mbits, at 100% on the vertical axis (in other words, when the buffer memory 30 is full), reproduced data for 3 seconds has been stored.

When the reproducing operation is started, where the point of the elapsed time is 0 sec., the amount of data stored in the buffer memory 30 is zero. Thus, at step F304, the CPU 31 causes the spindle motor to operate at a speed twice as high as the standard speed. Data decoded in the 2-times speed reproducing operation is stored in the buffer memory 30. As denoted by area A shown in FIG. 11, the amount of data stored in the buffer memory 30 increases.

It is assumed that the amount of data stored in the buffer memory 30 becomes 50% (data for 1.5 seconds) and that the reproduced data is output at 0.75 seconds after the reproducing operation is started. In other words, data is read from the buffer memory 30 at a predetermined rate. The data is output as an audio signal from a terminal 33 through a D/A converter 32.

After 0.75 seconds, data is read from the disc 1 and written to the buffer memory 30 at the 2-times speed. However, since data is read from the buffer memory 30 at the 1-time speed, the increasing speed of data stored slightly weakens as denoted by area B.

After the amount of data continuously increases as the area B, at 1.65 seconds, when the amount of data stored in the buffer memory 30 becomes 80%, the flow advances to step F305 (in FIG. 10). Thus, the CPU 31 switches the speed of the spindle motor 2 to the 1.5-times speed. In the 1.5-times speed reproducing operation, data that has been decoded is stored in the buffer memory 30. In this state, the data write rate to the buffer memory 30 decreases. Thus, as denoted by area C, the increasing speed of the amount of data stored in the buffer memory 30 becomes weaker than that in the area B.

Thereafter, when the amount of data stored in the buffer memory 30 becomes 90% at 2.25 seconds after the reproducing operation is started, the flow advances to step F306 (in FIG. 10). Thus, the CPU 31 switches the speed of the spindle motor 2 to the standard speed (1-time speed). Data decoded in the standard speed reproducing operation is stored in the buffer memory 30. In this state, the data write rate to the buffer memory 30 matches the data read rate from the buffer memory 30. Thus, as denoted by area D, the amount of data stored in the buffer memory 30 is still kept at 90%.

When the reproducing operation is performed, if the retry mode is performed as the result of the frame checking process and the error checking process, since the data writing operation to the buffer memory 30 is temporarily stopped, the amount of data stored in the buffer memory 30 decreases. However, when the amount of data stored in the buffer memory 30 decreases to 80 to 90% by the process shown in FIG. 10, the CPU 31 switches the speed of the spindle motor 2 to the 1.5-times speed. When the amount of data stored in the buffer memory 30 decreases to 80% or less, the CPU 31 switches the speed of the spindle motor 2 to the 2-times speed. Thus, the amount of data stored in the buffer memory 30 is restored to 90%. In this state, the speed of the spindle motor 2 is the 1-time speed. Thus, the state of which the amount of data stored in the buffer memory 30 is 90% is kept.

As described above, corresponding to the amount of data stored in the buffer memory 30, the CPU 31 switches the speed of the spindle motor 2, thereby varying the data write rate to the buffer memory. Thus, the CPU 31 controls the amount of data stored in the buffer memory 30 so that it is kept to almost full (90%), but not full. Thus, in the normal state, the retry operation due to the full state of the buffer memory 30 does not take place. Consequently, the number of times of the track jumping operation becomes the minimum necessary for keeping the quality of the data. Thus, the power consumption due to the track jumping operation is reduced. In addition, the deterioration of sound quality due to electric noise in the track jumping operation can be minimized.

Of course, since the amount of data of 90% is kept, the shock proof function can be sufficiently accomplished.

In addition, the rotation speed of the spindle motor 2 is almost kept at the standard speed. Thus, the power consumption of the spindle motor 2 can be reduced. In addition, it is not necessary to use a motor that can always rotate at the 2-times speed as the spindle motor 2. Thus, the cost of parts can be reduced.

In addition, in such a CD player, due to a deformation of the disc 1, a dislocation thereof, an irregular rotation of a driving unit, and so forth, a jitter may take place in the reproduced signal. When the reproduced signal contains such a jitter, the S/N ratio deteriorates. Thus, an error often takes place in the reproduced data. When the number of rotations of the disc 1 is increased, the frequence component of the jitter takes place in a high frequency region. As the frequency rises, the S/N ratio of the RF amplifier 7 deteriorates. Thus, when the number of rotations of the disc 1 increases and thereby the frequency component of the jitter is present in a high frequency region, the S/N ratio remarkably deteriorates and thereby the error rate of the reproduced data deteriorates.

As described above, in the shock proof process, the reproduced data is stored in the buffer memory 30. The continuity of data is determined with sub Q data. Although CIRC error correction code is added to audio data, only CRC code for detecting an error is added to the sub Q data. Thus, when the jitter component is large, if the number of rotations of the disc 1 is increased, since the error rate deteriorates, the sub Q data cannot be read.

To solve such a problem, in this example, the jitter is measured. The maximum rotation speed of the disc 1 is determined corresponding to the measured value of the jitter. In other words, when the jitter is smaller than the reference value, the maximum rotation speed of the spindle motor 2 is increased. When the jitter is larger than the reference value, the maximum rotation speed of the spindle motor 2 is decreased. Thus, the maximum rotation speed of the disc 1 is set up as long as the error rate thereof is permitted.

A jitter appears as a blurring of an RF signal (eye pattern) read from the disc 1. When the RF signal is wave-shaped as an EFM signal that is a binary pulse train, the jitter appears as a deviation of the phase of the EFM signal. Thus, when the difference between the phase of the EFM signal and the phase of the reproduced clock is measured, the intensity of the jitter can be obtained.

Figure 12:
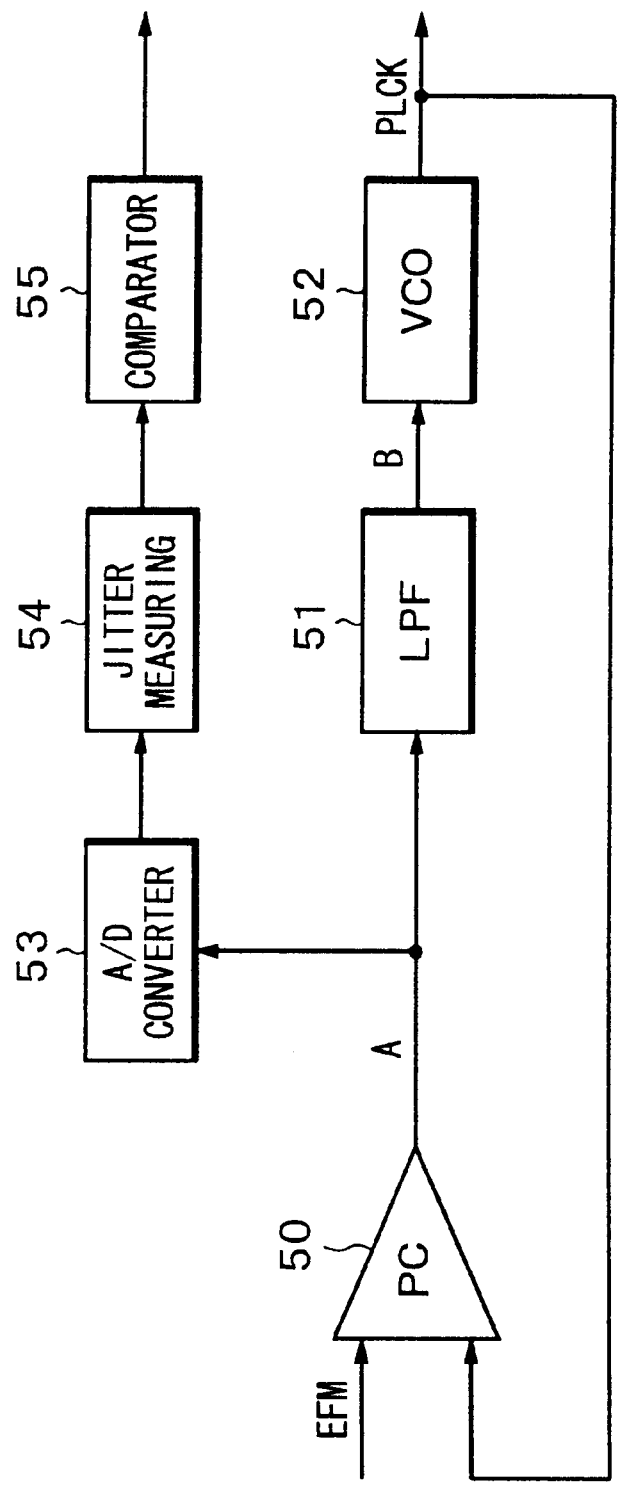
FIG. 12 is a block diagram showing an example of a jitter measuring circuit.

FIG. 12 is a block diagram showing an example of the structure of a jitter detecting circuit that measures the jitter. In FIG. 12, an EFM signal and a reproduced clock PLCK are supplied to a phase comparator 50. The reproduced clock PLCK is received from a voltage control oscillator (VCO) 52. The phase comparator 50 compares the phase of the EFM signal with the phase of an output signal of the VCO 52. An output signal of the phase comparator 50 is supplied to the VCO 52 through a low pass filter 51. The oscillation frequency of the VCO 52 is controlled corresponding to the output signal of the phase comparator 50 through the low pass filter 51. With such a PLL, the reproduced clock PLCK is extracted.

In addition, the output signal of the phase comparator 50 is supplied to an A/D converter 53. As described above, the intensity of the jitter is detected corresponding to the difference between the phase of the EFM signal and the phase of the reproduced clock. Thus, the output signal of the phase comparator 50 corresponds to the intensity of the jitter. The A/D converter 53 digitizes the output signal of the phase comparator 50. An output signal of the A/D converter 53 is supplied to a jitter measuring circuit 54. An output signal of the jitter measuring circuit 54 is supplied to a comparator 55.

The jitter measuring circuit 54 stores, for example, eight frames of the output signal of the A/D converter 53 at a time. Whenever the jitter measuring circuit 54 stores eight frames of the signal, the jitter measuring circuit 54 sends the signal to the comparator 55. The comparator 55 compares the value of the signal with a predetermined value and determines whether or not the intensity of the jitter exceeds a predetermined value.

Since one frame of data is equivalent to six samples at 44.1 kHz sampled (namely, 136 $\mu$sec), eight frames are equivalent to around 1 msec. In this embodiment, the reference value of the comparator 55 is designated a value equivalent to 10 nsec. Thus, the comparator 55 determines whether or not the jitter contained in the RF signal for data on the order of 10 nsec.

When the signal A is directly supplied to the A/D converter 53, if the influence of the high frequency component is too strong, an output signal of the phase comparator 50 may be supplied to the A/D converter 53 through a low pass filter with a predetermined cutoff frequency. Instead of using the A/D converter 53, the intensity of the jitter can be measured in the following manner. In this case, an output signal of the phases comparator 53 is stored in a capacitor for a predetermined time period. The voltage is compared with a reference voltage. Alternatively, a jitter detecting unit as disclosed in Japanese Patent Examined Publication No. HEI4-63580 can be used, the disclosure of which is incorporated herein by reference.

Figure 13:
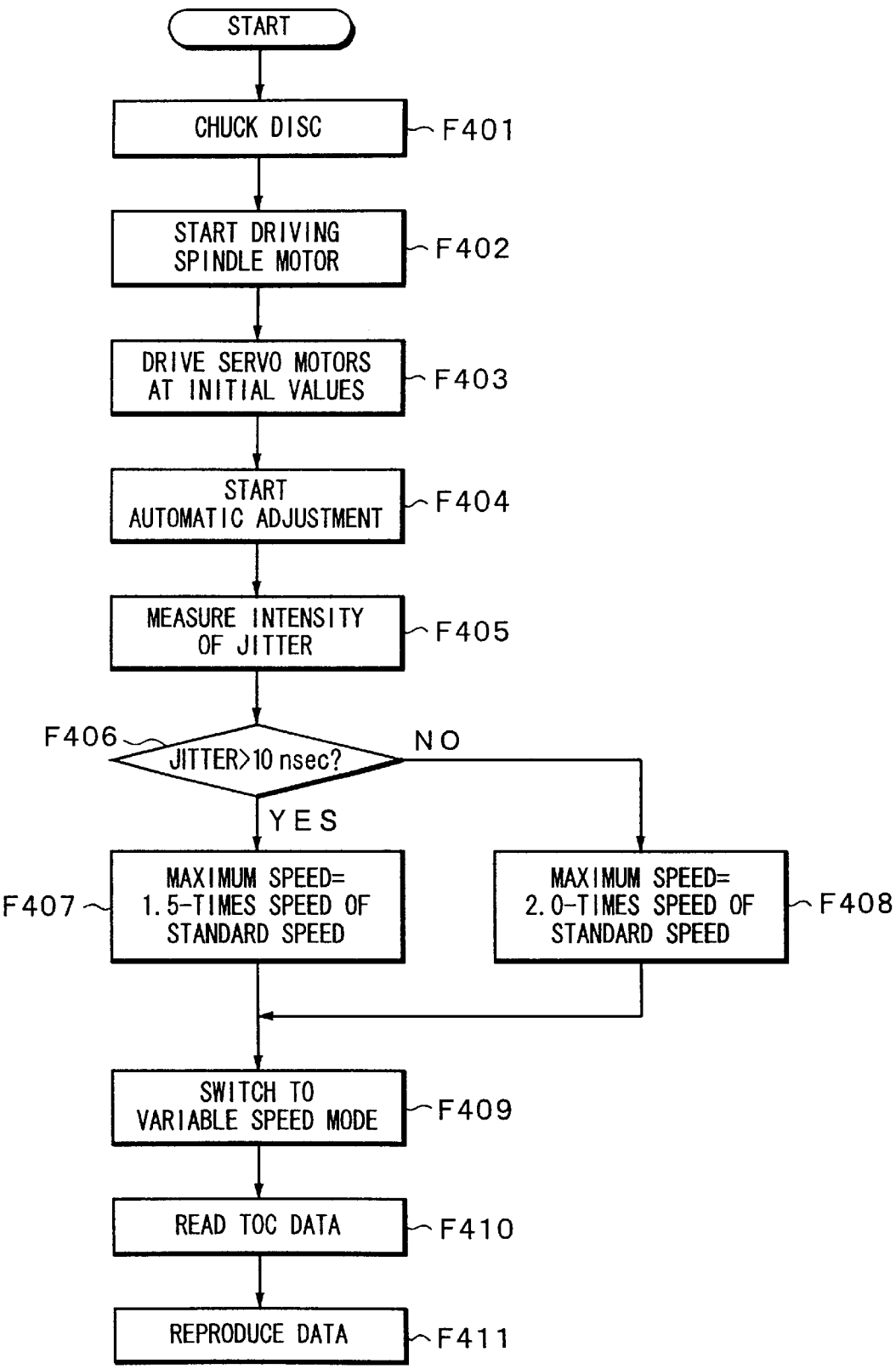
FIG. 13 is a flow chart showing an example of the maximum rotation speed setting process of the spindle motor.

FIG. 13 is a flow chart showing a process for determining the maximum rotation speed of the disc corresponding to the intensity of the jitter being measured.

First of all, at step F401, the disc 1 is chucked. Thereafter, the disc 1 is set to the spindle motor 2. After that, the flow advances to step F402. At step F402, the spindle motor 2 is started. Thereafter, the flow advances to step F403. At step F403, the servo gain of the focus servo motor and the tracking servo motor are set to initial values. Thereafter, the servo motors are operated. At this point, the disc 1 is controlled in the constant line velocity mode. Next, the flow advances to step F404. At step F404, each system portion is automatically adjusted. At step F405, the intensity of the jitter is measured.

At this point, the intensity of the jitter is measured at, for example, the lead-in area of the innermost periphery of the disc 1. This is because the lead-in area on the innermost periphery of the disc 1 has TOC. In addition, the information of the TOC should be read at first. Moreover, on the inner most periphery of the disc 1, since the rotation speed is high, a jitter tends to take place.

After the intensity of the jitter has been measured at step F405, the flow advances to step F406. At step F406, it is determined whether or not the intensity of the jitter measured is larger than a predetermined value (for example, 10 nsec.)

When the intensity of the jitter measured is larger than the predetermined value, the process advances to step F407. At step F407, the maximum rotation speed of the disc 1 is set to the 1.5-times speed. When the intensity of the jitter measured is smaller than the predetermined value, the flow advances to step F408. At step F408, the maximum rotation speed of the disc is set to the 2.0-times speed.

After the maximum speed of the disc has been set up at step F407 or F408, the process advances to step F409. At step F409, the speed mode is switched to the variable speed mode. At step F410, TOC data is read from the lead-in area of the disc. At step F411, the reproducing operation for data is started.

In the above-described embodiment, after the disc 1 has been chucked, the intensity of the jitter is measured one time so as to determine the maximum rotation speed of the disc 1. However, it is preferable to always monitor the intensity of the jitter because the intensity of the jitter varies depending on the contamination, scratches, physical defects of the disc. In the following example, the intensity of the jitter is measured while data is being reproduced, at intervals of a predetermined time period, or at intervals of predetermined number of tracks. Corresponding to the measured result, the maximum rotation speed of the disc is set up.

Figure 14:
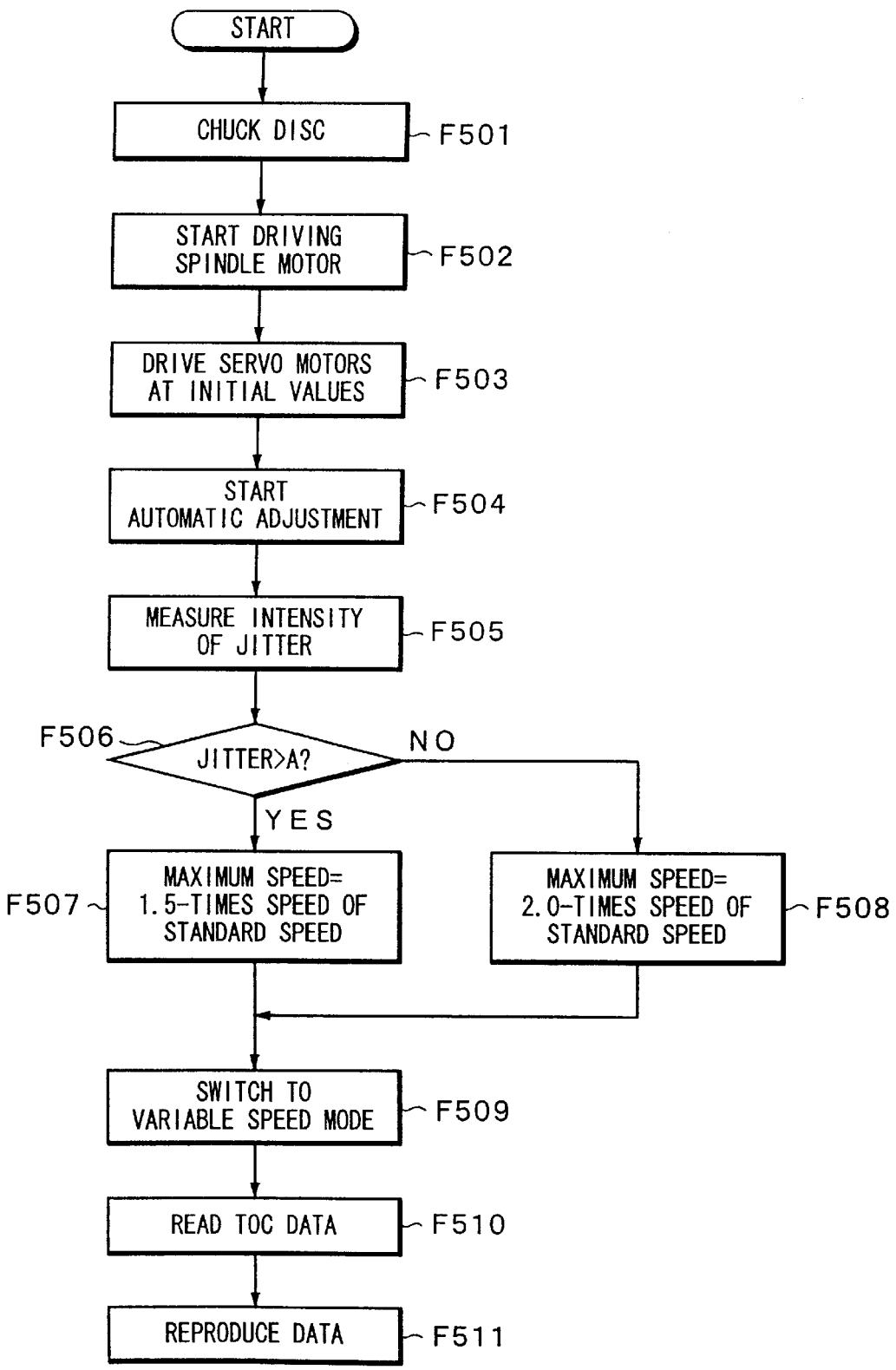
FIG. 14 is a flow chart showing another example of the maximum rotation speed setting process of the spindle motor.

FIG. 14 shows processes after the disc 1 is chucked until data is reproduced at first. In this case, the processes shown in FIG. 14 are basically the same as the processes shown in FIG. 13. However, in FIG. 14, the predetermined value used to measure the intensity of the jitter is set corresponding to jitter intensity table data shown in FIG. 15.

At step F501, the disc 1 is chucked. The disc 1 is set to the spindle motor 2. After the disc 1 has been set, the flow advances to step F502. At step F502, the spindle motor 2 is driven. Thereafter, the flow advances to step F503. The servo gains and so forth of the focus servo motor and the tracking servo motor are set to initial values. Thereafter, these servo motors are driven with the initial values. At this point, the disc 1 is controlled in the constant line velocity mode. Next, the flow advances to step F504. At step F504, the adjustment values of the individual portions of the system are automatically adjusted. At step F505, the intensity of the jitter is measured. The intensity of the jitter is measured on for example the innermost periphery of the disc 1 at first.

After the intensity of the jitter has been measured at step F505, the flow advances to step F506. At step F506, it is determined whether or not the intensity of the jitter measured is larger than the predetermined value. At this point, the predetermined value is obtained depending on the jitter intensity table data shown in FIG. 15. For example, when the 1-time speed CLV mode is used, the predetermined value compared with the intensity of the jitter is set to "A".

When the intensity of the jitter measured is larger than the predetermined value, the flow advances to step F507. At step F507, the maximum rotation speed of the disc is set to 1.5-times speed. When the intensity of the jitter measured is smaller than the predetermined value, the flow advances to step F508. At step F508, the maximum rotation speed of the disc is set to 2.0-times speed.

After the maximum speed of the disc has been set up at step F507 or F508, the flow advances to step F509. At step F509, the mode is switched to the variable speed mode. Thereafter, the flow advances to step F510. At step F510, TOC data is read from the lead-in area of the disc. Thereafter, the flow advances to step F511. At step F511, the data reproducing operation is started.

Figure 16:
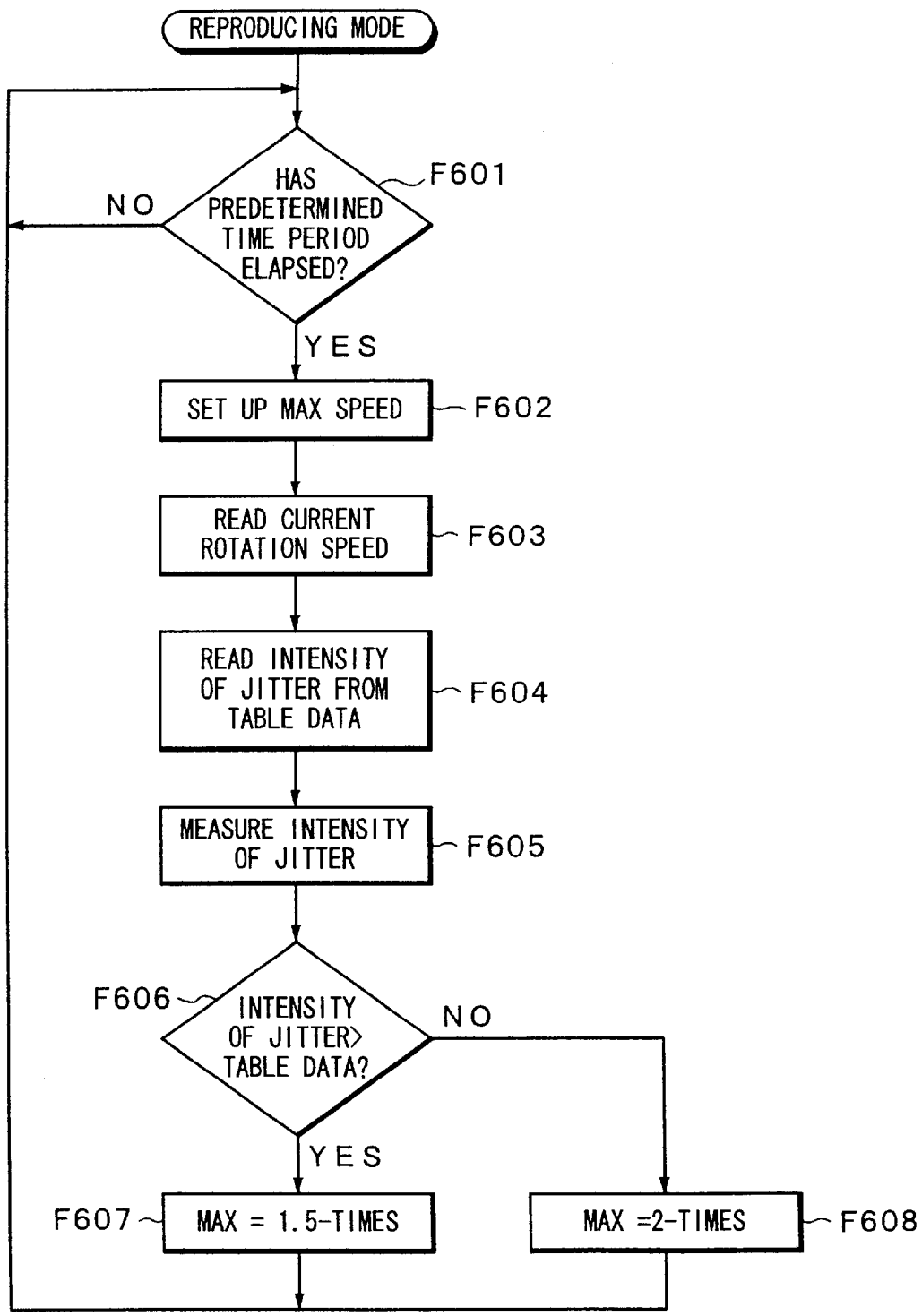
FIG. 16 is a flow chart showing a jitter measuring process at intervals of a predetermined time period.

FIG. 16 shows a process for measuring the intensity of a jitter at intervals of a predetermined time period. At step F601, it is determined whether or not a predetermined time period has elapsed. When the predetermined time period has elapsed, the process advances to step F602. At step F602, the speed of the disc is set to the maximum rotation speed. A predetermined value compared with the intensity of the jitter is obtained corresponding to the jitter intensity table data shown in FIG. 15 (at F604).

At step F605, the intensity of the jitter is measured. At step F606, it is determined whether or not the intensity of the jitter measured is larger than the predetermined value.

When the intensity of the jitter being measured is larger than the predetermined value, the flow advances to step F607. At step F607, the maximum rotation speed of the disc is set to 1.5-times speed. When the intensity of the jitter being measured is smaller than the predetermined value, the flow advances to step F608. At step F608, the maximum rotation speed of the disc is set to 2.0-times speed.

Figure 17:
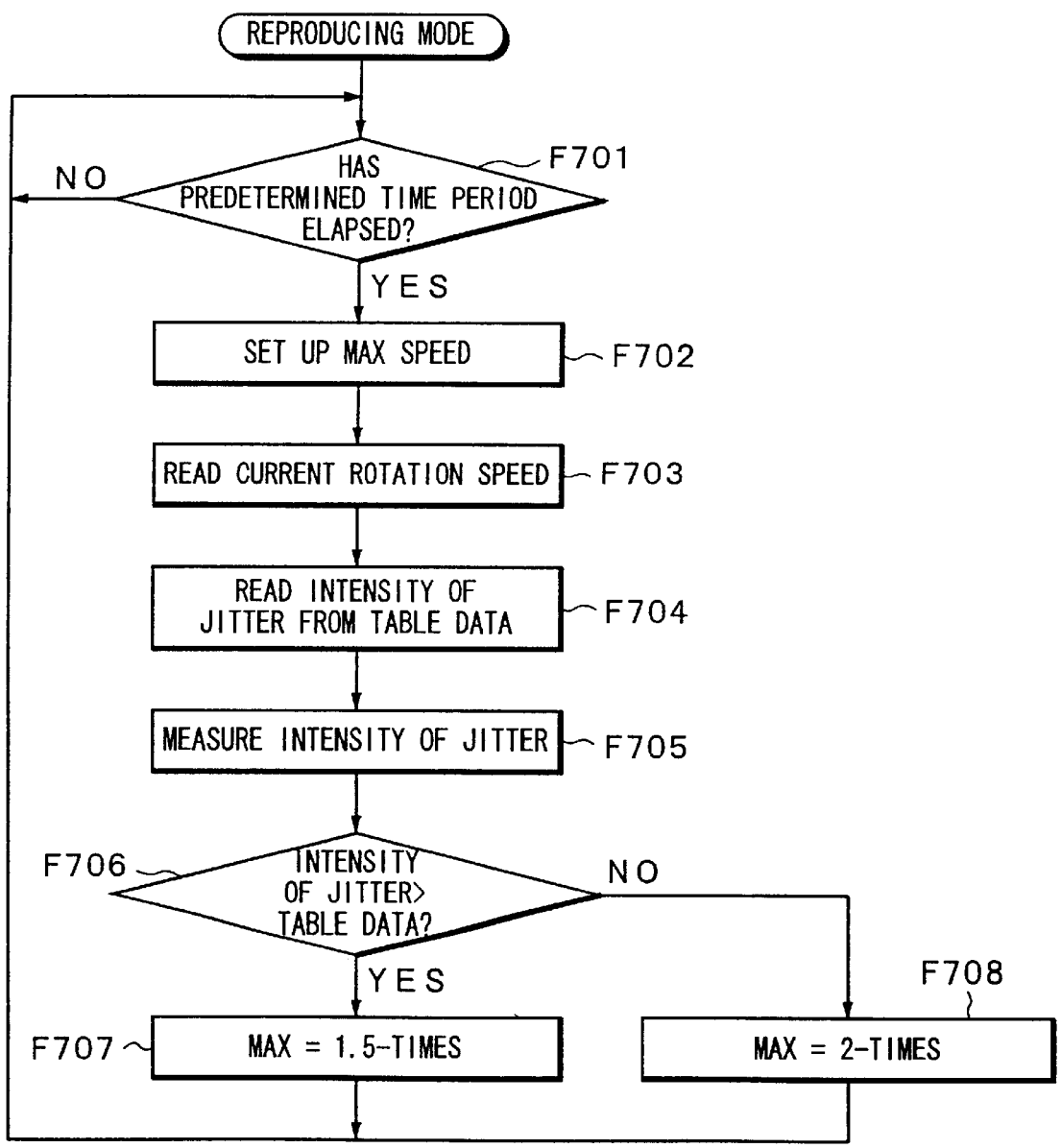
FIG. 17 is a flow chart showing a jitter measuring process at intervals of a predetermined number of tracks.

Alternatively, the intensity of the jitter can be measured at intervals of a predetermined number of tracks instead of at intervals of a predetermined time period. FIG. 17 shows a process for measuring the intensity of a jitter at intervals of a predetermined number of tracks. At step F701, it is determined whether or not a predetermined number of tracks have passed. When the predetermined number of tracks have passed, the flow advances to step F702. At step F702, the speed of the disc is set to the maximum speed. At step F705, predetermined value compared with the intensity of the jitter is obtained from the jitter intensity table data shown in FIG. 15 corresponding to the current rotation speed of the disc (at step F703).

At step F705, the intensity of the jitter is measured. At step F706, it is determined whether or not the intensity of the jitter measured is larger than the predetermined value.

When the intensity of the jitter measured is larger than the predetermined value, the flow advances to step F707. At step F707, the maximum rotation speed of the disc is set to 1.5-times speed. When the intensity of the jitter measured is smaller than the predetermined value, the flow advances to step F708. At step F708, the maximum rotation speed of the disc is set to 2.0-times speed.

Figure 18:
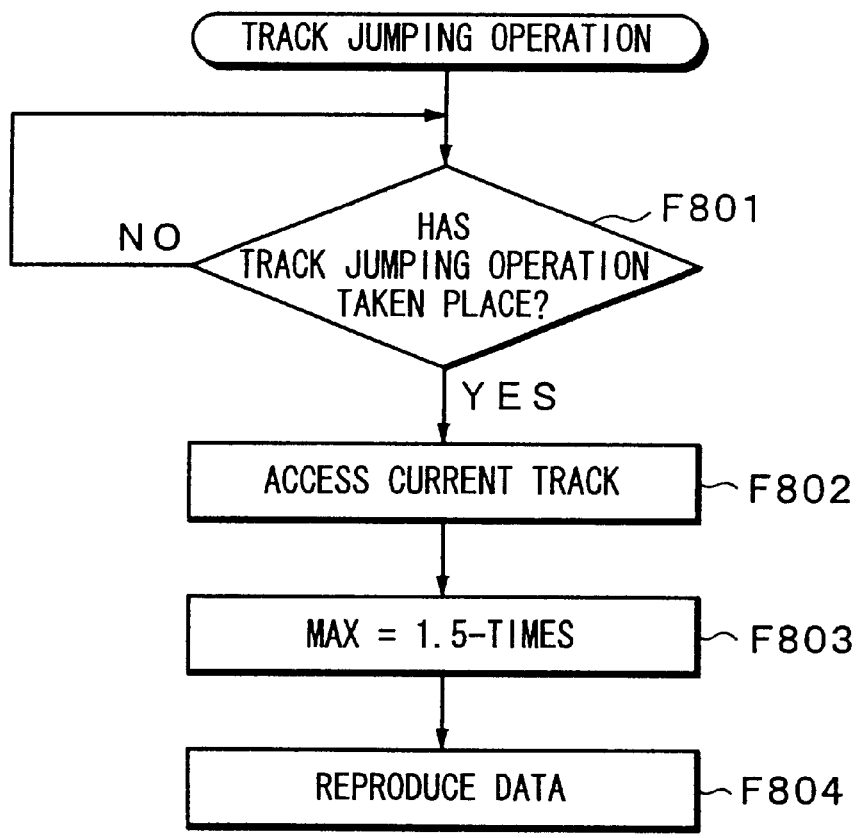
FIG. 18 is a flow chart showing an accessing process in a track jumping operation.

While data is being reproduced, if a track jumping operation is performed, a process as shown in FIG. 18 is performed. When the track jumping operation is performed at step F801, the flow advances to step F802. At step F802, the current track is accessed. Thereafter, the flow advances to step F803. At step F803, the maximum rotation speed of the disc is set to 1.5-times speed. Thereafter, the flow advances to step F804. At step F804, the reproducing operation for data is started.

In the above-described embodiments, a reproducing apparatus of variable speed controlling type (namely, wide capture type) was described. However, it should be noted that the present invention is not limited to such embodiments. Instead, to accelerate or decelerate the rotation speed of the disc, the system clock may be switched. Alternatively, the CPU may switch the rotation speed of the disc between the standard speed and the 2-times speed.

According to the present invention, the maximum speed of the spindle motor is set up corresponding to the intensity of the jitter of the disc from which data is read. Thus, data can be read at the highest available speed as long as a read error does not take place. In addition, while data is being reproduced, at intervals of a predetermined time period, or at intervals of a predetermined number of tracks, the intensity of a jitter is measured and thereby the maximum speed of the spindle motor is set up. Thus, data can be always read at the highest available speed as long as a read error does not take place. Moreover, as described above, in accordance with one aspect of the present invention, the disc controller such as the CPU 31 is configured to control the speed of the spindle motor 2 based upon the amount of data stored in the buffer memory 30 and the measured value of the jitter such that the overall system can achieve the shockproof function while minimizing the error rate of the reproduced data. In this manner, the present invention provides various advantages for an information processing apparatus and method such that shockproof function and error minimization can be achieved either separately or in an integrated manner by a control mechanism for controlling the speed of the spindle motor based upon the amount of data temporarily stored in a memory such as the buffer memory (DRAM) 30 shown in FIG. 1 and the level of jitter measured by the jitter detecting circuit as shown, for example, in FIG. 12 of the present application Having described a specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An information reproducing apparatus, comprising:
    reproducing means for reproducing information recorded on a record medium;
    driving means for driving the record medium in a variable speed;
    storing means for temporarily storing information reproduced by said reproducing means at a transfer rate in accordance with the speed of said driving means;
    reading means for reading information stored in said storing means;
    checking means for checking the amount of information reproduced by said reproducing means;
    measuring means for measuring a jitter of information reproduced by said reproducing means; and
    drive controlling means for controlling the speed of said driving means in accordance with the amount of information checked by said checking means or the jitter measured by said measuring means;
    wherein said measuring means includes:
        a phase comparator configured to receive an EFM signal and a reproduced clock signal and in accordance therewith, generating a phase comparator output signal;
        a low pass filter configured to receive said phase comparator output signal and to output a low pass filtered signal;
        a voltage controlled oscillator (VCO) configured to receive the low pass filtered signal and outputting said reproduced clock signal;
        a converter for converting said phase comparator output signal to an equivalent digital signal;
        a jitter measuring circuit for storing said digital signal output from said converter and for outputting a predetermined number of frames of said digital signal output; and
        a comparator for comparing said predetermined number of frames of said digital signal output with a predetermined value to determine whether the digital signal output exceeds said predetermined value;
        wherein said phase comparator compares the phase of said EFM signal and the phrase of an output signal of the VCO.

2. The apparatus of claim 1 wherein the maximum speed of said driving means is configured to correspond to the amount of information checked by said checking means or the jitter measured by said measuring means.

3. The apparatus of claim 1
    wherein said drive controlling means controls said driving means in a constant line velocity mode while said measuring means is measuring a jitter component, and further
    wherein said drive controlling means controls said driving means in a variable velocity mode after the maximum speed has been set up.

4. The apparatus of claims 1 wherein said drive controlling means controls said measuring means to measure the jitter a plurality of times while said reproducing means is reproducing the information from the record medium.

5. The apparatus of claim 4 wherein said measuring means first measures the jitter on the innermost periphery of the record medium.

6. The apparatus of claim 4 wherein the maximum speed of said driving means is configured to correspond to the amount of information checked by said checking means and the jitter measured by said measuring means.

7. The apparatus of claim 5,
    wherein said drive controlling means controls said driving means in a constant line velocity mode while said measuring means is measuring a jitter component, and further
    wherein said drive controlling means controls said driving means in a variable velocity mode after the maximum speed has been set up.

8. The apparatus of claim 1 wherein said drive controlling means decreases the maximum speed of said driving means when the measured jitter value is greater than a predetermined value.

9. An information reproducing method, comprising the steps of:

reproducing information recorded on a record medium;
driving the record medium in a variable speed;
temporarily storing said reproduced information reproduced at a transfer rate in accordance with the variable speed;
reading information stored at said step of temporarily storing;
checking the amount of information reproduced at said step of reproducing;
measuring a jitter of information reproduced at said step of reproducing; and
controlling the speed of driving the recording medium in accordance with the amount of information checked at said checking step or the jitter measured at said measuring step;
wherein said measuring step includes the steps of:
a phase comparing step for receiving an EFM signal and a reproduced clock signal, and in accordance therewith, generating a phase compared output signal;
low pass filtering step for receiving said phase comparator output signal and to output a low pass filtered signal;
a voltage controlled oscillating step for receiving the low pass filtered signal and outputting said reproduced clock signal;
a converting step for converting said phase compared output signal to an equivalent digital signal;
a jitter measuring step for storing said digital signal output from said converting step and for outputting a predetermined number of frames of said digital signal output; and
a comparing step for comparing said predetermined number of frames of said digital signal output with a predetermined value to determine whether the digital signal output exceeds said predetermined value;
wherein said phase comparing step compares the phase of said EFM signal and the phrase of an output signal of the VCO.

10. The method of claim 9 wherein the maximum speed at said step of driving the record medium is configured to correspond to the amount of information checked at said checking step or the jitter measured at said measuring step.

11. The method of claim 10
wherein said step of controlling controls said step of driving in a constant line velocity mode while said step of measuring measures a jitter component, and further
wherein said step of controlling controls said step of driving in a variable velocity mode after the maximum speed has been set up.

12. The method of claims 9 wherein said step of controlling controls said step of measuring to measure the jitter a plurality of times while said step of reproducing is reproducing the information from the record medium.

13. The method of claim 12 wherein said step of measuring first measures the jitter on the innermost periphery of the record medium.

14. The method of claim 12 wherein the maximum speed of said step of driving is configured to correspond to the amount of information checked at said step of checking and the jitter measured at said measuring step.

15. The method of claim 13,
wherein said step of controlling controls said step of driving in a constant line velocity mode while said step of measuring measures a jitter component, and further
wherein said step of controlling controls said step of driving in a variable velocity mode after the maximum speed has been set up.

16. The method of claim 9 wherein said step of controlling decreases the maximum speed of said driving step when the measured jitter value is greater than a predetermined value.

17. An information reproducing apparatus, comprising:
reproducing means for reproducing information recorded on a record medium;
driving means for driving the record medium in a variable speed;
storing means for temporarily storing information reproduced by said reproducing means at a transfer rate in accordance with the speed of said driving means;
reading means for reading information stored in said storing means;
checking means for checking the amount of information reproduced by said reproducing means;
measuring means for measuring a jitter of information reproduced by said reproducing means; and
drive controlling means for controlling the speed of said driving means corresponding to the amount of information checked by said checking means and the jitter measured by said measuring means;
wherein said measuring means includes:
a phase comparator configured to receive an EFM signal and a reproduced clock signal, and in accordance therewith, generating a phase comparator output signal;
a low pass filter configured to receive said phase comparator output signal and to output a low pass filtered signal;
a voltage controlled oscillator (VCO) configured to receive the low pass filtered signal and outputting said reproduced clock signal;
a converter for converting said phase comparator output signal to an equivalent digital signal;
a jitter measuring circuit for storing said digital signal output from said converter and for outputting a predetermined number of frames of said digital signal output; and
a comparator for comparing said predetermined number of frames of said digital signal output with a predetermined value to determine whether the digital signal output exceeds said predetermined value;
wherein said phase comparator compares the phase of said EFM signal and the phrase of an output signal of the VCO.

18. The apparatus of claim 17 wherein the maximum speed of said driving means is configured to correspond to the amount of information checked by said checking means and the jitter measured by said measuring means.

19. The apparatus of claim 18
wherein said drive controlling means controls said driving means in a constant line velocity mode while said measuring means is measuring a jitter component, and further
wherein said drive controlling means controls said driving means in a variable velocity mode after the maximum speed has been set up.

20. The apparatus of claims 17 wherein said drive controlling means controls said measuring means to measure the jitter a plurality of times while said reproducing means is reproducing the information from the record medium.

21. The apparatus of claim 20 wherein said measuring means first measures the jitter on the innermost periphery of the record medium.

22. The apparatus of claim 20 wherein the maximum speed of said driving means is configured to correspond to the amount of information checked by said checking means and the jitter measured by said measuring means.

23. The apparatus of claim 21,
wherein said drive controlling means controls said driving means in a constant line velocity mode while said measuring means is measuring a jitter component, and further
wherein said drive controlling means controls said driving means in a variable velocity mode after the maximum speed has been set up.

24. The apparatus of claim 17 wherein said drive controlling means decreases the maximum speed of said driving means when the measured jitter value is greater than a predetermined value.

25. An information reproducing method, comprising the steps of:
reproducing information recorded on a record medium;
driving the record medium in a variable speed;
temporarily storing said reproduced information reproduced at a transfer rate in accordance with the variable speed;
reading information stored at said step of temporarily storing;
checking the amount of information reproduced at said step of reproducing;
measuring a jitter of information reproduced at said step of reproducing; and
controlling the speed of driving the recording medium corresponding to the amount of information checked at said checking step and the jitter measured at said measuring step;
wherein said measuring step includes the steps of:
a phase comparing step for receiving an EFM signal and a reproduced clock signal, and in accordance therewith generating a phase compared output signal;
low pass filtering step for receiving said phase comparator output signal and to output a low pass filtered signal;
a voltage controlled oscillating step for receiving the low pass filtered signal and outputting said reproduced clock signal;
a converting step for converting said phase compared output signal to an equivalent digital signal;
a jitter measuring step for storing said digital signal output from said converting step and for outputting a predetermined number of frames of said digital signal output; and
a comparing step for comparing said predetermined number of frames of said digital signal output with a predetermined value to determine whether the digital signal output exceeds said predetermined value;
wherein said phase comparing step compares the phase of said EFM signal and the phrase of an output signal of the VCO.

26. The method of claim 25 wherein the maximum speed at said step of driving the record medium is configured to correspond to the amount of information checked at said checking step and the jitter measured at said measuring step.

27. The method of claim 26
wherein said step of controlling controls said step of driving in a constant line velocity mode while said step of measuring measures a jitter component, and further
wherein said step of controlling controls said step of driving in a variable velocity mode after the maximum speed has been set up.

28. The method of claims 25 wherein said step of controlling controls said step of measuring to measure the jitter a plurality of times while said step of reproducing is reproducing the information from the record medium.

29. The method of claim 28 wherein said step of measuring first measures the jitter on the innermost periphery of the record medium.

30. The method of claim 28 wherein the maximum speed of said step of driving is configured to correspond to the amount of information checked at said step of checking and the jitter measured at said measuring step.

31. The method of claim 29,
wherein said step of controlling controls said step of driving in a constant line velocity mode while said step of measuring measures a jitter component, and further
wherein said step of controlling controls said step of driving in a variable velocity mode after the maximum speed has been set up.

32. The method of claim 25 wherein said step of controlling decreases the maximum speed of said driving step when the measured jitter value is greater than a predetermined value.

33. An information reproducing apparatus, comprising:
an optical head for reproducing data recorded on a disc;
a driver for driving the disc at a variable speed;
a memory for temporarily storing data reproduced by said optical head at a transfer rate in accordance with the speed of said driver;
a memory controller for reading data stored in said memory;
a controller for checking the amount of data reproduced by said memory controller;
a jitter detecting circuit for measuring a jitter of data reproduced by said optical head; and
a drive controlling unit for controlling the speed of said driver in accordance with the amount of data checked by said controller or the measured jitter;
wherein said jitter detection circuit includes:
a phase comparator configured to receive an EFM signal and a reproduced clock signal, and in accordance therewith, generating a phase comparator output signal;
a low pass filter configured to receive said phase comparator output signal and to output a low pass filtered signal;
a voltage controlled oscillator (VCO) configured to receive the low pass filtered signal and outputting said reproduced clock signal;
a converter for converting said phase comparator output signal to an equivalent digital signal;
a jitter measuring circuit for storing said digital signal output from said converter and for outputting a predetermined number of frames of said digital signal output; and
a comparator for comparing said predetermined number of frames of said digital signal output with a predetermined value to determine whether the digital signal output exceeds said predetermined value;
wherein said phase comparator compares the phase of said EFM signal and the phrase of an output signal of the VCO.

34. The apparatus of claim 33 wherein said phase comparator output signal corresponds to the intensity of the jitter.

35. The apparatus of claim 33 wherein said predetermined number of frames of the digital signal output includes eight frames.

36. The apparatus of claim 35 wherein said eight frames is approximately 1 msecond.

37. The apparatus of claim 33 wherein said predetermined value of said comparator is 10 nseconds.

38. The apparatus of claim 37 wherein said each frame of said digital signal output is approximately six samples sampled at 44.1 kHz.

39. The apparatus of claim 33 wherein the maximum speed of said driver is configured to correspond to the amount of information checked by said controller or the jitter measured by said jitter detection circuit.

40. The apparatus of claim 39
wherein said drive controlling unit controls said driver in a constant line velocity mode while said jitter detection circuit is measuring a jitter component, and further wherein said drive controlling unit controls said driver in a variable velocity mode after the maximum speed has been set up.

41. The apparatus of claims 33 wherein said drive controlling unit controls said jitter detection circuit to measure the jitter a plurality of times while said optical bead is reproducing the data from the disc.

42. The apparatus of claim 41 wherein said jitter detection circuit first measures the jitter on the innermost periphery of the disc.

43. The apparatus of claim 42
wherein said drive controlling unit controls said driver in a constant line velocity mode while said jitter detection circuit is measuring a jitter component, and further wherein said drive controlling unit controls said driver in a variable velocity mode after the maximum speed has been set up.

44. The apparatus of claim 41 wherein the maximum speed of said driver is configured to correspond to the amount of data checked by said controller and the jitter measured by said jitter detection unit.

45. The apparatus of claim 33 wherein said drive controlling unit decreases the maximum speed of said driver when the measured jitter value is greater than a predetermined value.

46. The apparatus of claim 33 wherein said optical head includes a laser outputting unit, an optical system, an objective lens and a detector.

47. The apparatus of claim 46 wherein said laser outputting unit is a laser diode.

48. The apparatus of claim 46 wherein said optical system includes a polarizing beam splitter and a ¼ wavelength plate.

49. The apparatus of claim 46 further including an actuator, wherein said objective lens is coupled to said actuator such that said objective lens is configured to move in a plurality of directions.

50. The apparatus of claim 49 wherein said plurality of directions include a tracking direction and a focusing direction.

51. The apparatus of claim 50 wherein said tracking direction corresponds to the radial direction of the disc, and further, wherein said focusing direction corresponds to the contacting direction of the disc.

52. The apparatus of claim 33 wherein said memory is a DRAM.

53. The apparatus of claim 33 wherein said controller is a CPU.

54. An information reproducing apparatus, comprising:
an optical head for reproducing data recorded on a disc;
a driver for driving the disc at a variable speed;
a memory for temporarily storing data reproduced by said optical head at a transfer rate in accordance with the speed of said driver;
a memory controller for reading data stored in said memory;
a controller for checking the amount of data reproduced by said memory controller;
a jitter detecting circuit for measuring a jitter of data reproduced by said optical head; and
a drive controlling unit for controlling the speed of said driver corresponding to the amount of data checked by said controller and the measured jitter;
wherein said jitter detection circuit includes:
a phase comparator configured to receive an EFM signal and a reproduced clock signal, and in accordance therewith, generating a phase comparator output signal;
a low pass filter configured to receive said phase comparator output signal and to output a low pass filtered signal;
a voltage controlled oscillator (VCO) configured to receive the low pass filtered signal and outputting said reproduced clock signal;
a converter for converting said phase comparator output signal to an equivalent digital signal;
a jitter measuring circuit for storing said digital signal output from said converter and for outputting a predetermined number of frames of said digital signal output; and
a comparator for comparing said predetermined number of frames of said digital signal output with a predetermined value to determine whether the digital signal output exceeds said predetermined value;
wherein said phase comparator compares the phase of said EFM signal and the phrase of an output signal of the VCO.

55. The apparatus of claim 54 wherein said phase comparator output signal corresponds to the intensity of the jitter.

56. The apparatus of claim 54 wherein said predetermined number of frames of the digital signal output includes eight frames.

57. The apparatus of claim 56 wherein said eight frames is approximately 1 msecond.

58. The apparatus of claim 54 wherein said predetermined value of said comparator is 10 nseconds.

59. The apparatus of claim 58 wherein said each frame of said digital signal output is approximately six samples sampled at 44.1 kHz.

60. The apparatus of claim 54 wherein the maximum speed of said driver is configured to correspond to the amount of information checked by said controller and the jitter measured by said jitter detection circuit.

61. The apparatus of claim 60
wherein said drive controlling unit controls said driver in a constant line velocity mode while said jitter detection circuit is measuring a jitter component, and further wherein said drive controlling unit controls said driver in a variable velocity mode after the maximum speed has been set up.

62. The apparatus of claims 54 wherein said drive controlling unit controls said jitter detection circuit to measure the jitter a plurality of times while said optical head is reproducing the data from the disc.

63. The apparatus of claim 62 wherein said jitter detection circuit first measures the jitter on the innermost periphery of the disc.

64. The apparatus of claim 63,
wherein said drive controlling unit controls said driver in a constant line velocity mode while said jitter detection circuit is measuring a jitter component, and further wherein said drive controlling unit controls said driver in a variable velocity mode after the maximum speed has been set up.

65. The apparatus of claim 62 wherein the maximum speed of said driver is configured to correspond to the amount of data checked by said controller and the jitter measured by said jitter detection unit.

66. The apparatus of claim 54 wherein said drive controlling unit decreases the maximum speed of said driver when the measured jitter value is greater than a predetermined value.

67. The apparatus of claim 54 wherein said optical head includes a laser outputting unit, an optical system, an objective lens and a detector.

68. The apparatus of claim 67 wherein said laser outputting unit is a laser diode.

69. The apparatus of claim 67 wherein said optical system includes a polarizing beam splitter and a ¼ wavelength plate.

70. The apparatus of claim 67 further including an actuator, wherein said objective lens is coupled to said actuator such that said objective lens is configured to move in a plurality of directions.

71. The apparatus of claim 70 wherein said plurality of directions include a tracking direction and a focusing direction.

72. The apparatus of claim 71 wherein said tracking direction corresponds to the radial direction of the disc, and further, wherein said focusing direction corresponds to the contacting direction of the disc.

73. The apparatus of claim 54 wherein said memory is a DRAM.

74. The apparatus of claim 54 wherein said controller is a CPU.

* * * * *

UNITED STATES PATENT AND TRADEMARK OFFICE
CERTIFICATE OF CORRECTION

PATENT NO. : 6,246,650 B1
DATED : June 12, 2001
INVENTOR(S) : Hitoshi Kuroiwa

It is certified that error appears in the above-identified patent and that said Letters Patent is hereby corrected as shown below:

Column 1,
Line 59, delete "of the".

Column 3,
Line 39, delete "and".

Column 6,
Line 11, delete "to";
Line 12, delete "to".

Column 7,
Line 42, change "sown" to -- shown --.

Column 9,
Line 6, delete "of".

Column 10,
Line 30, change "extend" to -- extent --.

Column 11,
Line 5, insert -- roughly -- before "checked".

Column 13,
Line 61, delete "to".

Column 20,
Line 35, change "1" to -- 2 --;
Line 43, change "claims" to -- claim --.

Column 21,
Line 50, change "claims" to -- claim --.

Column 22,
Line 59, change "claims" to -- claim --.

UNITED STATES PATENT AND TRADEMARK OFFICE
CERTIFICATE OF CORRECTION

PATENT NO. : 6,246,650 B1
DATED : June 12, 2001
INVENTOR(S) : Hitoshi Kuroiwa

It is certified that error appears in the above-identified patent and that said Letters Patent is hereby corrected as shown below:

<u>Column 23,</u>
Line 36, insert -- , -- before "generating.".

<u>Column 24,</u>
Line 1, change "claims" to -- claim --.

<u>Column 25,</u>
Line 18, change "claims" to -- claim --;
Line 20, change "bead" to -- head --.

<u>Column 26,</u>
Line 57, change "claims" to -- claim --.

Signed and Sealed this

Eleventh Day of June, 2002

*Attest:*

JAMES E. ROGAN
*Attesting Officer*     *Director of the United States Patent and Trademark Office*